US010460144B2

United States Patent
Ryshtun et al.

(10) Patent No.: US 10,460,144 B2
(45) Date of Patent: Oct. 29, 2019

(54) NON-FINGER OBJECT REJECTION FOR FINGERPRINT SENSORS

(71) Applicant: Cypress Semiconductor Corporation, San Jose, CA (US)

(72) Inventors: Andriy Ryshtun, Lviv (UA); Oleksandr Rohozin, Lviv (UA); Viktor Kremin, Lviv (UA); Oleg Kapshii, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/713,346

(22) Filed: Sep. 22, 2017

(65) Prior Publication Data

US 2018/0025199 A1    Jan. 25, 2018

Related U.S. Application Data

(63) Continuation-in-part of application No. 15/466,670, filed on Mar. 22, 2017.

(60) Provisional application No. 62/364,684, filed on Jul. 20, 2016, provisional application No. 62/419,769, filed on Nov. 9, 2016, provisional application No. 62/420,327, filed on Nov. 10, 2016.

(51) Int. Cl.
*G06K 9/00* (2006.01)

(52) U.S. Cl.
CPC .......... *G06K 9/0002* (2013.01); *G06K 9/001* (2013.01); *G06K 9/0008* (2013.01)

(58) Field of Classification Search
None
See application file for complete search history.

(56) References Cited

U.S. PATENT DOCUMENTS

| 3,928,842 | A | 12/1975 | Green et al. |
| 5,926,555 | A | 7/1999 | Ort et al. |
| 5,953,441 | A | 9/1999 | Setlak |
| 6,292,576 | B1 | 9/2001 | Brownlee |
| 6,466,686 | B2 | 10/2002 | Senior |

(Continued)

FOREIGN PATENT DOCUMENTS

| CN | 103324944 A | 9/2013 |
| CN | 105981049 A | 9/2016 |

(Continued)

OTHER PUBLICATIONS

Antonelli et al., Fake Finger Detection by Skin Distortion Analysis, Aug. 14, 2006 [retrieved Oct. 16, 2017], IEEE Transacitons on Information Forensics and Security, vol. 1, Issue 3, pp. 360-373. Retrieved from the Internet: http://ieeexplore.ieee.org/document/1673397/#full-text-section.

(Continued)

*Primary Examiner* — Nancy Bitar

(57) ABSTRACT

A method for detecting a finger at a fingerprint sensor includes detecting a presence of an object at a fingerprint sensor and, in response to detecting the presence of the object, acquiring image data for the object based on signals from the fingerprint sensor. The method further includes, for each subset of one or more subsets of the image data, calculating a magnitude value for a spatial frequency of the subset, and identifying the object as a finger based on comparing the magnitude value to a threshold.

19 Claims, 18 Drawing Sheets

(56) References Cited

U.S. PATENT DOCUMENTS

| | | | |
|---|---|---|---|
| 7,072,523 B2 * | 7/2006 | Bolle | G06K 9/00067 382/124 |
| 7,146,029 B2 | 12/2006 | Manansala | |
| 7,200,250 B2 | 4/2007 | Chou | |
| 7,480,397 B2 | 1/2009 | Ide | |
| 7,505,613 B2 | 3/2009 | Russo | |
| 7,545,621 B2 | 6/2009 | Haddad | |
| 7,804,984 B2 | 9/2010 | Sidlauskas et al. | |
| 7,809,168 B2 | 10/2010 | Abiko et al. | |
| 7,831,010 B2 | 11/2010 | Tobita | |
| 7,831,070 B1 | 11/2010 | Cheng et al. | |
| 8,090,163 B2 | 1/2012 | Schuckers et al. | |
| 8,275,178 B2 | 9/2012 | Boshra | |
| 8,958,607 B2 | 2/2015 | Juveneton et al. | |
| 9,104,901 B2 | 8/2015 | Minteer et al. | |
| 9,251,329 B2 | 2/2016 | Lien et al. | |
| 9,400,911 B2 | 7/2016 | Erhart et al. | |
| 9,471,764 B2 | 10/2016 | Coons | |
| 9,471,827 B2 | 10/2016 | Thiebot et al. | |
| 9,582,705 B2 * | 2/2017 | Du | G06K 9/00033 |
| 9,639,765 B2 | 5/2017 | Du et al. | |
| 9,652,696 B2 | 5/2017 | Won | |
| 9,665,763 B2 | 5/2017 | Du et al. | |
| 9,760,753 B2 | 9/2017 | Bechtel | |
| 9,767,358 B2 * | 9/2017 | Xue | G06K 9/0061 |
| 2003/0123714 A1 | 7/2003 | O'Gorman et al. | |
| 2006/0034493 A1 | 2/2006 | Shimamura et al. | |
| 2008/0166028 A1 | 7/2008 | Turek et al. | |
| 2010/0066697 A1 | 3/2010 | Jacomet et al. | |
| 2014/0201126 A1 * | 7/2014 | Zadeh | G06K 9/627 706/52 |
| 2014/0337930 A1 * | 11/2014 | Hoyos | H04L 63/10 726/4 |
| 2016/0063294 A1 * | 3/2016 | Du | G06K 9/0002 382/124 |
| 2016/0117544 A1 * | 4/2016 | Hoyos | H04N 5/23219 348/78 |
| 2016/0140380 A1 | 5/2016 | Carver et al. | |
| 2016/0148034 A1 * | 5/2016 | Kremin | G06K 9/0002 382/124 |
| 2016/0335483 A1 | 11/2016 | Pfursich et al. | |
| 2016/0350573 A1 | 12/2016 | Kitchens et al. | |
| 2017/0124374 A1 | 5/2017 | Rowe et al. | |
| 2018/0089484 A1 * | 3/2018 | Satou | A61B 5/117 |
| 2018/0173936 A1 * | 6/2018 | Mizoguchi | G06T 7/00 |

FOREIGN PATENT DOCUMENTS

| | | | |
|---|---|---|---|
| CN | 106030613 A | 10/2016 | |
| KR | 101055603 B1 | 8/2011 | |
| KR | 1451376 B1 | 10/2014 | |

OTHER PUBLICATIONS

Arunalatha G. "Spoof Detection of Fingerprint Biometrics based on Local and Global Quality Measures," International Journal of Computer Applications, vol. 124, No. 16, Aug. 2015, pp. 22-25; 4 pages.

Arunalatha G., "Fingerprint Spoof Detection Using Quality Features," International Journal of Security and Its Applications, vol. 9, No. 10, 2015, pp. 83-94; 12 pages.

International Search Report for International Application No. PCT/US17/38156 dated Jul. 18, 2017; 5 pages.

Kristin Nixon, "Multispectral Fingerprint Imaging for Spoof Detection," SPIE, vol. 5779, Jun. 2, 2015, pp. 214-225; 12 pages.

Samruddhi Kulkarni, "Survey on Fingerprint Spoofing, Detection Techniques and Databases" International Journal of Computer Applications, 2015, pp. 30-33; 4 pages.

Shoude Chang, "Fingerprint Spoof Detection Using Near Infrared Optical Analysis," Intech, Jul. 2011, pp. 57-85; 30 pages.

USPTO Applicant Initiated Interview Summary for U.S. Appl. No. 15/466,670 dated Aug. 3, 2017; 4 pages.

USPTO Final Rejection for U.S. Appl. No. 15/466,670 dated Nov. 1, 2017; 19 pages.

USPTO Non Final Rejection for U.S. Appl. No. 15/466,670 dated May 31, 2017; 16 pages.

Written Opinion of the International Searching Authority for International Application No. PCT/US17/38156 dated Jul. 18, 2017; 8 pages.

USPTO Advisory Action for U.S. Appl. No. 15/466,670 dated Jan. 25, 2018; 11 pages.

USPTO Applicant Initiated Interview Summary for U.S. Appl. No. 15/466,670 dated Jan. 5, 2018; 4 pages.

USPTO Applicant Initiated Interview Summary for U.S. Appl. No. 15/466,670 dated Feb. 5, 2018; 3 pages.

USPTO Non-Final Rejection for U.S. Appl. No. 15/713,346 dated Dec. 8, 2017; 10 pages.

USPTO Advisory Action for U.S. Appl. No. 15/466,670 dated Feb. 14, 2018; 2 pages.

USPTO Non Final Rejection for U.S. Appl. No. 15/466,670 dated Apr. 5, 2018; 61 pages.

USPTO Applicant Initiated Interview Summary for U.S. Appl. No. 15/466,670 dated Jul. 9, 2018; 4 pages.

USPTO Advisory Action for U.S. Appl. No. 15/466,670 dated Feb. 12, 2019; 3 pages.

USPTO Applicant Initiated Interview Summary for U.S. Appl. No. 15/466,670 dated Jan. 23, 2019; 7 pages.

USPTO Final Rejection for U.S. Appl. No. 15/466,670 dated Nov. 19, 2018; 81 pages.

USPTO Non Final Rejection for U.S. Appl. No. 15/466,670 dated Jun. 26, 2019; 61 pages.

USPTO Applicant Initiated Interview Summary for U.S. Appl. No. 15/466,670 dated Sep. 4, 2019; 7 pages.

* cited by examiner

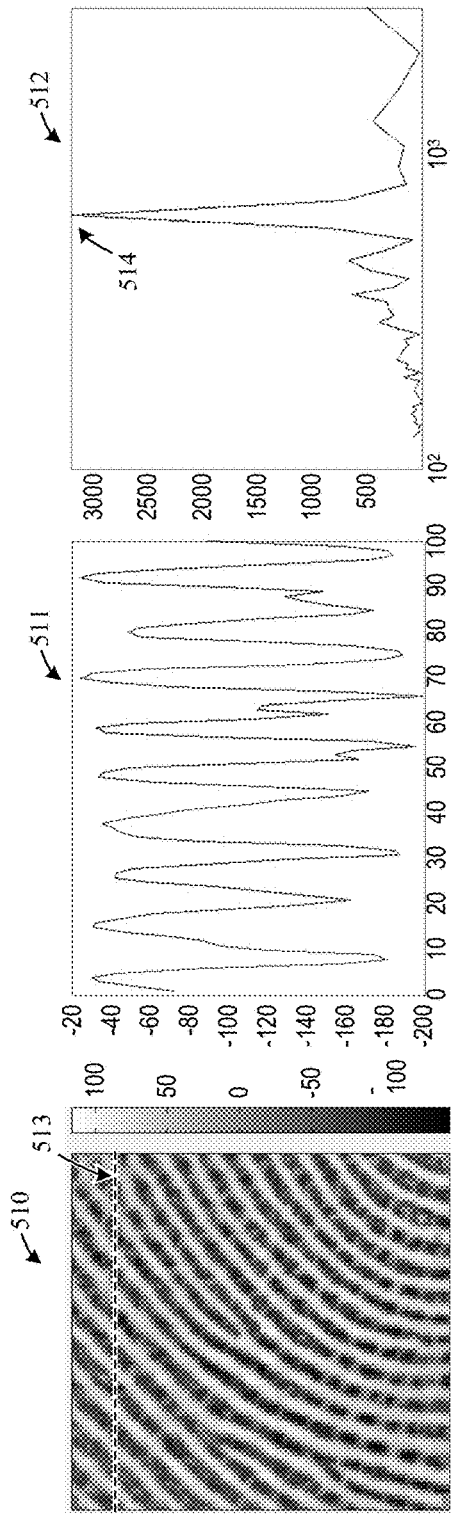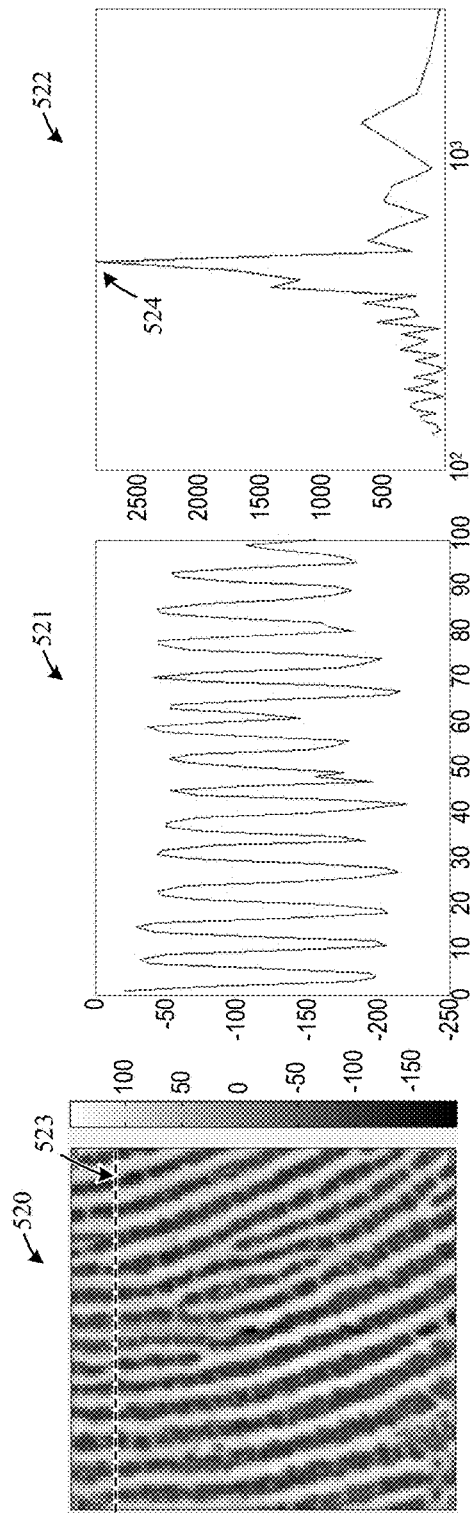
FIGURE 5A
FIGURE 5B

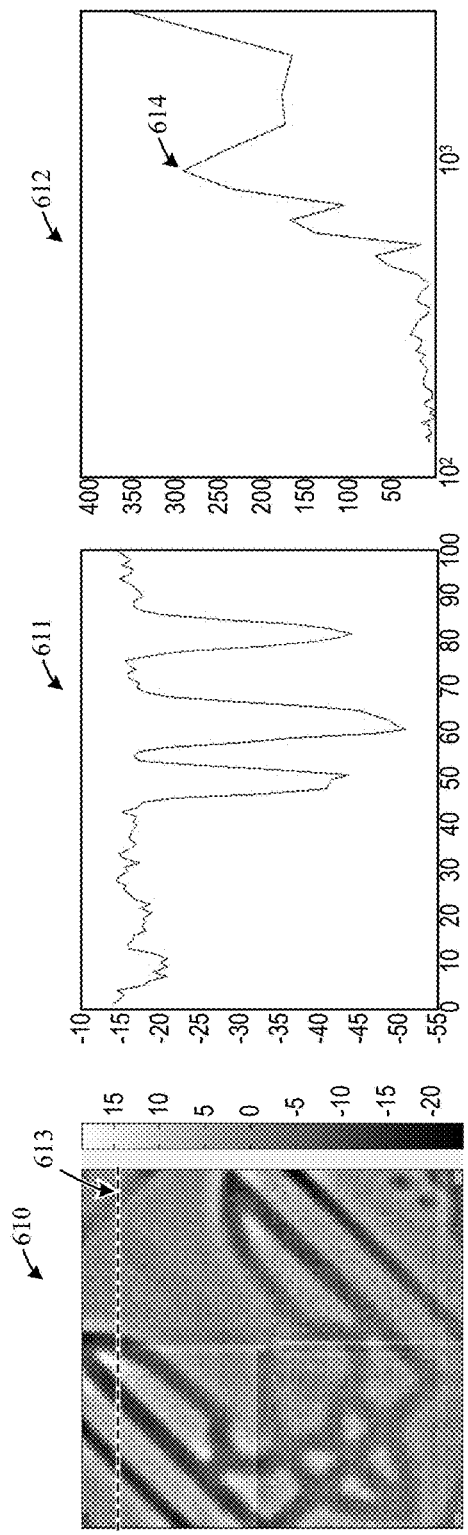
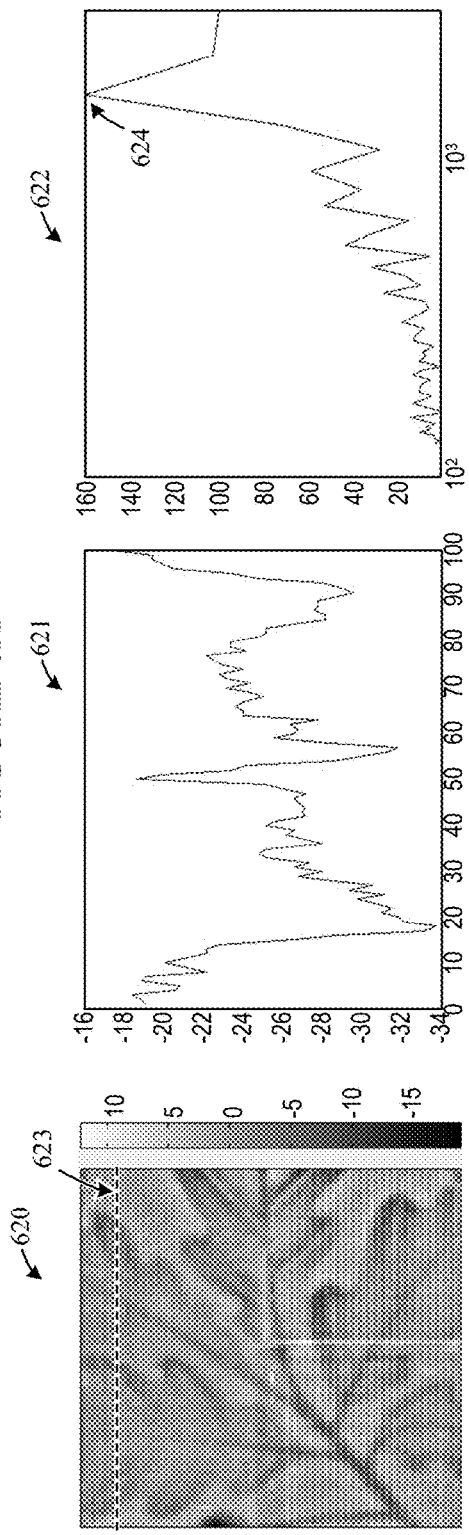
FIGURE 6A
FIGURE 6B

NON-FINGER OBJECT REJECTION FOR FINGERPRINT SENSORS

RELATED APPLICATIONS

This application is a continuation-in-part of application Ser. No. 15/466,670, filed Mar. 22, 2017, which claims priority to U.S. Provisional Application No. 62/420,327, filed on Nov. 10, 2016, to U.S. Provisional Application No. 62/419,769, filed on Nov. 9, 2016, and to U.S. Provisional Application No. 62/364,684, filed on Jul. 20, 2016, all of which are incorporated by reference herein in their entirety.

TECHNICAL FIELD

This disclosure relates to the field of fingerprint sensors and, in particular, to finger detection techniques for fingerprint sensors.

BACKGROUND

Capacitance sensing systems function by sensing electrical signals generated on electrodes that reflect changes in capacitance. Such changes in capacitance can indicate a touch event or the presence of ridges and valleys of a fingerprint. Fingerprint sensing may be used for security and validation applications for a variety of user interface devices, such as mobile handsets, personal computers, and tablets. The use of capacitance sensing for fingerprint detection may allow for a sensor to be placed in the surface of a user interface device with a great degree of configurability. That is, a sensor is not constrained to a single location for all devices. Rather, a fingerprint sensor may be disposed in a location on the device that is convenient for a particular industrial design, or to optimize a user's experience.

Capacitance-based fingerprint sensors function by measuring the capacitance of a capacitive sense element, such as a sensor electrode, and detecting a change in capacitance indicating a presence or absence of a fingerprint ridge (or valley). Ridges and valleys at identifiable locations on an array of sense elements may be used to reconstruct the image of the fingerprint for use in enrollment, validation, and security applications. When a fingerprint ridge comes into contact with a sense element, the capacitance change caused by the fingerprint ridge is detected. The capacitance change of the sense elements can be measured by an electrical circuit that converts the capacitances measured from the capacitive sense elements into digital values.

BRIEF DESCRIPTION OF THE DRAWINGS

The present disclosure is illustrated by way of example, and not by way of limitation, in the figures of the accompanying drawings.

FIGS. 5A-5B illustrate full images, section line signals, and spatial frequency spectra for fingers, according to an embodiment.

FIGS. 6A-6B illustrate full images, section line signals, and spatial frequency spectra for coins, according to an embodiment.

DETAILED DESCRIPTION

Figure 1:
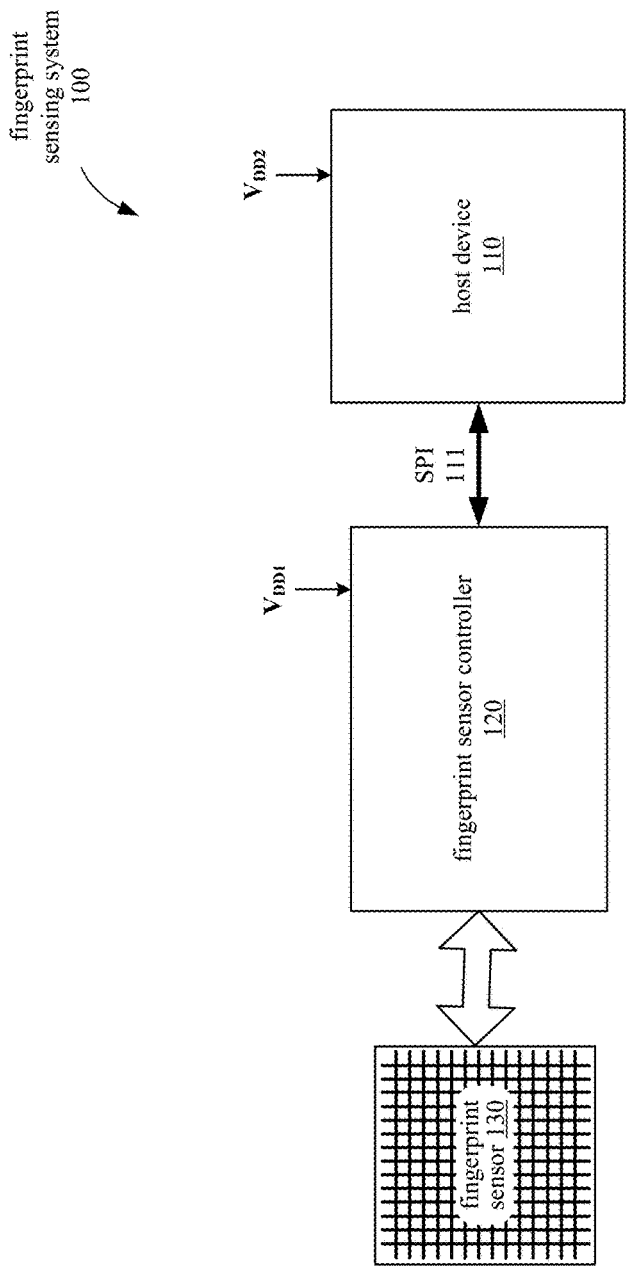
FIG. 1 is a block diagram illustrating an embodiment of a fingerprint sensing system.

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the spirit and scope of the claimed subject matter.

One embodiment of a fingerprint sensing system reduces overall power consumption by maintaining some of its components, such as a host processor, in a low power consumption state (e.g., a sleep state) until a finger is detected at the fingerprint sensor. Such a fingerprint sensing system detects the presence of an object contacting the fingerprint sensor by measuring changes in capacitance, resistance, brightness, or other physical characteristics of the object. In response to detecting an object at the fingerprint sensor, the host processor and/or other devices in the fingerprint sensing system are transitioned to a higher power consumption state so that a fingerprint image can be acquired and processing can be performed on the fingerprint image. However, if the mechanism for detecting an object at the fingerprint sensor is triggered by non-finger objects, such as coins, keys, leather, fabric, etc., a full cycle of fingerprint image acquisition and processing could be initiated, resulting in an increase in power consumption and in user interruption even when no finger is present at the sensor. A reliable approach for distinguishing real fingers from non-finger objects allows the fingerprint sensing system to reject non-finger objects, thus preempting unnecessary image acquisition and processing and reducing overall power consumption.

In one embodiment, a process for recognizing and rejecting non-finger objects in a fingerprint sensing system is performed in a fingerprint sensor controller that can be operated in a different power mode than the host device, so that the rejection of non-finger objects can be performed while maintaining the host device in a low power consumption state. As a result, the host device can remain in the low power consumption state until an actual finger is present at the fingerprint sensor and real fingerprint data is available for processing. Furthermore, even if the host device is not in a low power consumption state (e.g., the host device is in a working or operating state) the rejection of non-finger objects using a separate fingerprint sensor controller avoids unnecessarily interrupting the host device to perform fingerprint processing tasks, such as fingerprint matching or navigation.

In one embodiment, a process for distinguishing a finger from a non-finger object in a fingerprint sensing system includes scanning the fingerprint sensor to acquire image data for a portion (e.g., a cross or grid of section lines) of the surface of the object, then analyzing the scanned portion in the frequency domain to identify and measure magnitudes associated with one or more spatial frequencies. A filter is applied to the spatial frequencies so that processing is only performed on spatial frequencies that lie within a predetermined range around the mean ridge breadth (MRB) of a human finger. Peaks within this MRB range (i.e., spatial frequencies having the highest magnitude) are identified. Human fingerprints produce sharp peaks in a spatial frequency spectrum generated in this matter. Applying a scaling coefficient that relates the peak amplitude to the mean value of spatial frequency magnitudes in the spectrum or to the width of the peak helps to distinguish these peaks. If resulting peak magnitude is higher than some predefined threshold, the fingerprint sensor controller interprets the object on the fingerprint sensor as a real finger.

In addition, the fingerprint sensor controller can also perform a ridge flow analysis of the surface of the object to improve the accuracy of the non-finger rejection process. In one embodiment, the fingerprint sensor controller scans a portion of the fingerprint sensor to acquire a partial image of the object's surface, then analyzing the ridge directions within several smaller regions (e.g., 9×9 pixels) of the partial image. The fingerprint sensor controller determines whether the number of these smaller regions bordering another region having an orthogonal ridge direction exceeds a threshold number, and whether the number of regions having a ridge direction that differs from an average ridge direction for the partial image exceeds a threshold number. The fingerprint controller interprets the object as a finger if all or most of the adjacent regions do not contain orthogonal ridge structures and if all or most of the ridge directions of the regions do not differ from the average ridge direction for the partial image by more than the threshold.

Based on the spatial frequency and ridge flow analysis, the fingerprint sensing system is able to reject conductive non-finger objects such as keys, coins, etc. in the fingerprint sensor controller without waking or interrupting a host device. In one embodiment, the fingerprint sensor controller can further conserve power and bandwidth by avoiding the acquisition of images of the rejected non-finger objects and/or avoiding the transmission of such images to the host device.

In addition, the spatial frequency analysis can be implemented in the host device for filtering out any purported fingerprint images having MRB values outside an expected range for the purposes of matching a user's fingerprints. If the fingerprint sensing system first determines that the peak spatial frequency of a fingerprint image is not within the expected MRB range of an authorized user's fingerprint, then the system can avoid performing a more computationally expensive fingerprint matching process since it is already clear that the fingerprint will not match.

In one embodiment, the spatial frequency and ridge flow analysis can be used to identify touches by non-finger objects having different spectral characteristics, such as a palm touch. In addition, changes in the peak spatial frequency and in its complex argument can be used to detect changes in the rotation angle and direction of a finger touching the sensor. In systems that use the fingerprint sensor as a navigation input device (e.g., for controlling a cursor or user other interface elements), the spatial frequency and ridge flow analysis can be used to filter out inputs from non-finger objects in order to eliminate unintentional navigation caused by accidental touches by these objects.

FIG. 1 illustrates an embodiment of a fingerprint sensing system 100 which distinguishes fingers from non-finger objects based on spatial frequencies and ridge flow analysis of image data captured from a fingerprint sensor 130. The fingerprint sensing system 100 includes a host device 110 coupled to a fingerprint sensor controller 120 via a serial peripheral interface (SPI) 111. The fingerprint sensor controller 120 is coupled to a fingerprint sensor 130. The fingerprint sensor 130 includes an array of capacitive sensor electrodes for imaging the surface of an object placed on the sensing surface of the fingerprint sensor 130.

Among other functions, the fingerprint sensor controller 120 transmits and receives signals to and from the fingerprint sensor 130 in order to acquire an image of the surface pattern of an object (e.g., a fingerprint of a user's finger) on the fingerprint sensor 130. The fingerprint sensor controller 120 can then securely transmit the acquired image to the host device 110 via SPI 111 to initiate authentication of the user in the host device 110. The host device 110 authenticates the user based on matching the acquired image with fingerprint data associated with the user in a database. Upon authenticating the user, the host device 110 grants access to a resource; for example, the host device 110 may be a mobile device, such as a phone or laptop computer that unlocks and grants access to a user interface or filesystem in response to a successful authentication.

In the fingerprint sensing system 100, the fingerprint sensor controller 120 is operable in a power mode that is different from the host device 110. As illustrated in FIG. 1, the fingerprint sensor controller 120 is supplied from a power supply $V_{DD1}$ while the host device 110 is supplied from $V_{DD2}$. Accordingly, the controller 120 and the host device 110 can be maintained in different power consumption states. The fingerprint sensor controller 120 is also capable of causing the host device 110 via interrupt or other signal to transition from a low power consumption state to a high power consumption state (e.g., wake the host device 110 from a sleep state) in response to detecting the presence of an object at the fingerprint sensor 130 or in response to identifying the object as a real finger.

In response to identifying the object as a real finger, the fingerprint sensor controller 120 acquires a more detailed or more complete image of the surface of the finger and transmits the image to the host device 110 for further processing. The host device 110 receives the image data from the fingerprint sensor controller 120 and performs further processing (e.g., fingerprint matching, navigation, etc.) on the image data.

Figure 2:
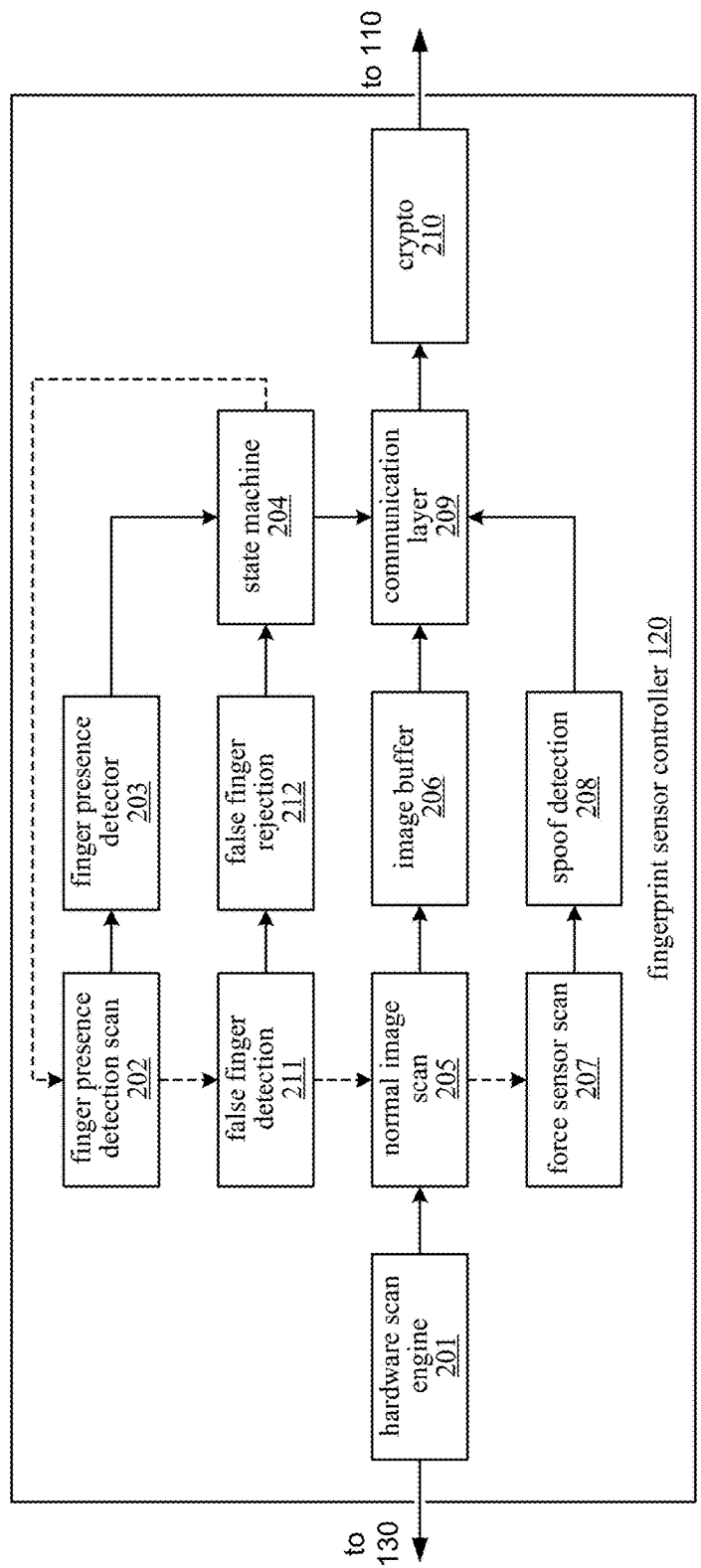
FIG. 2 is a block diagram illustrating an embodiment of a fingerprint sensor controller.

FIG. 2 illustrates the fingerprint sensing circuitry in the controller 120, according to an embodiment. The fingerprint sensor controller 120 includes several circuit modules and logic components that facilitate functions such as fingerprint imaging, low-power finger presence detection, non-finger object filtering, navigation (finger movement reporting), touch pressure detection, tap gesture detection, and secure communication with the host device 110.

One of these circuit modules is the hardware scan engine 201, which includes multiple sensing channels that can be connected to the electrodes of the fingerprint sensor 130. The sensing channels perform mutual capacitance or self-capacitance sensing using the electrodes in order to acquire fingerprint images from the fingerprint sensor 130. For example, for a mutual capacitance scanning method, the capacitances between intersecting pairs of sensor electrodes in the array are detected by transmitting a signal from a transmit (Tx) electrode in the pair to a receive (Rx) electrode in the pair. In one embodiment, the capacitance values may be measured as count values, with increasing count values corresponding to increasing capacitances. A high count value for a pixel in the fingerprint image thus indicates the presence of a conductive feature of the fingerprint, such as a ridge for the self-capacitance scanning method. For the mutual capacitance scanning method, the presence of a finger ridge decreases coupling between TX and RX electrodes near the ridge, corresponding to a proportional decrease in the raw count value.

The state machine 204 defines the sequence in which other modules in the fingerprint sensor controller 120 are activated. Transitions between states as defined by the state machine 204 may be initiated by inputs from other modules, such as finger presence detector 203, false finger rejection 212, spoof detection 208, etc.

The finger detection scan module 202 invokes the hardware scan engine 201 to detect the presence of a finger or other object at the fingerprint sensor 130. The finger presence detector 203 processes capacitance data acquired by the scan engine 201 to determine whether an object is present at the fingerprint sensor 130.

In response to detecting the presence of a finger or other object at the fingerprint sensor 130, the false finger detection module 211 invokes the hardware scan engine 201 to perform a scan of one or more section lines of image data based on signals from the fingerprint sensor 130. The false finger detection module 211 performs a spatial frequency analysis of the scanned section lines to determine whether the peak spatial frequencies of the section lines are within the normal MRB range of a human finger. The false finger detection module 211 also invokes the hardware scan engine to acquire partial image data from a portion of the fingerprint sensor 130 in order to perform a ridge flow analysis on the surface features of the object. The false finger detection module 211 generates metrics based on the spatial frequency and the ridge flow analyses.

The false finger rejection module 212 receives the metrics resulting from the spatial frequency and ridge flow analyses and determines whether the object present at the fingerprint sensor 130 should be interpreted as a real finger. In one embodiment, the false finger rejection module 212 compares the metrics to corresponding thresholds; alternatively, the determination may be based on weighting the metrics (e.g., multiplying by different weighting factors) and combining them with each other (e.g., by addition) or with other information such as calibration values. The false finger detection 211 and the false finger rejection 212 modules thus cooperate to identify and reject non-finger objects detected at the fingerprint sensor 130.

In one embodiment, if the object is determined to be a real finger, the normal image scan module 205 invokes the hardware scan engine 201 to perform a normal full scan of the fingerprint sensor 130 to acquire an image of the surface pattern of the finger to be used for authentication, navigation, or other processing. The acquired image is stored in the image buffer 206.

The spoof detection logic 208 performs anti-spoofing calculations based on image data acquired from the fingerprint sensor 130 and sensor data from other sources, such as a force sensor (via force sensor scan module 207) in order to determine whether an object at the fingerprint sensor 130 is a real finger or a spoof. In one embodiment, the spoof detection process only occurs in response to the false finger detection 211 and rejection 212 modules determining that the object at the fingerprint sensor 130 is a finger based on the spatial frequency analysis and ridge flow analysis. Thus, power is conserved since the spoof detection process is not invoked for objects that do not at least resemble actual fingers. In some embodiments, the spoof detection logic 208 may implement other detection mechanisms such as executing special types of scans, scanning on multiple frequencies, etc.

When the spoof detection logic 208 determines that the fingerprint image represents a real finger rather than a spoof object, the fingerprint image is transmitted to the host device 110. The fingerprint image from the image buffer 206 is prepared for transmission by communication layer 209 and encrypted by the cryptography module 210 prior to being transmitted in encrypted form over SPI 111 to the host device 110.

In addition to the above-described functions, embodiments of the fingerprint sensor controller 120 also include additional circuit modules and logic (omitted for clarity) for performing such functions as navigation (i.e., reporting of finger movement), touch pressure detection, tap gesture recognition, built-in manufacturing and self-tests, and firmware upgrades.

Figure 3:
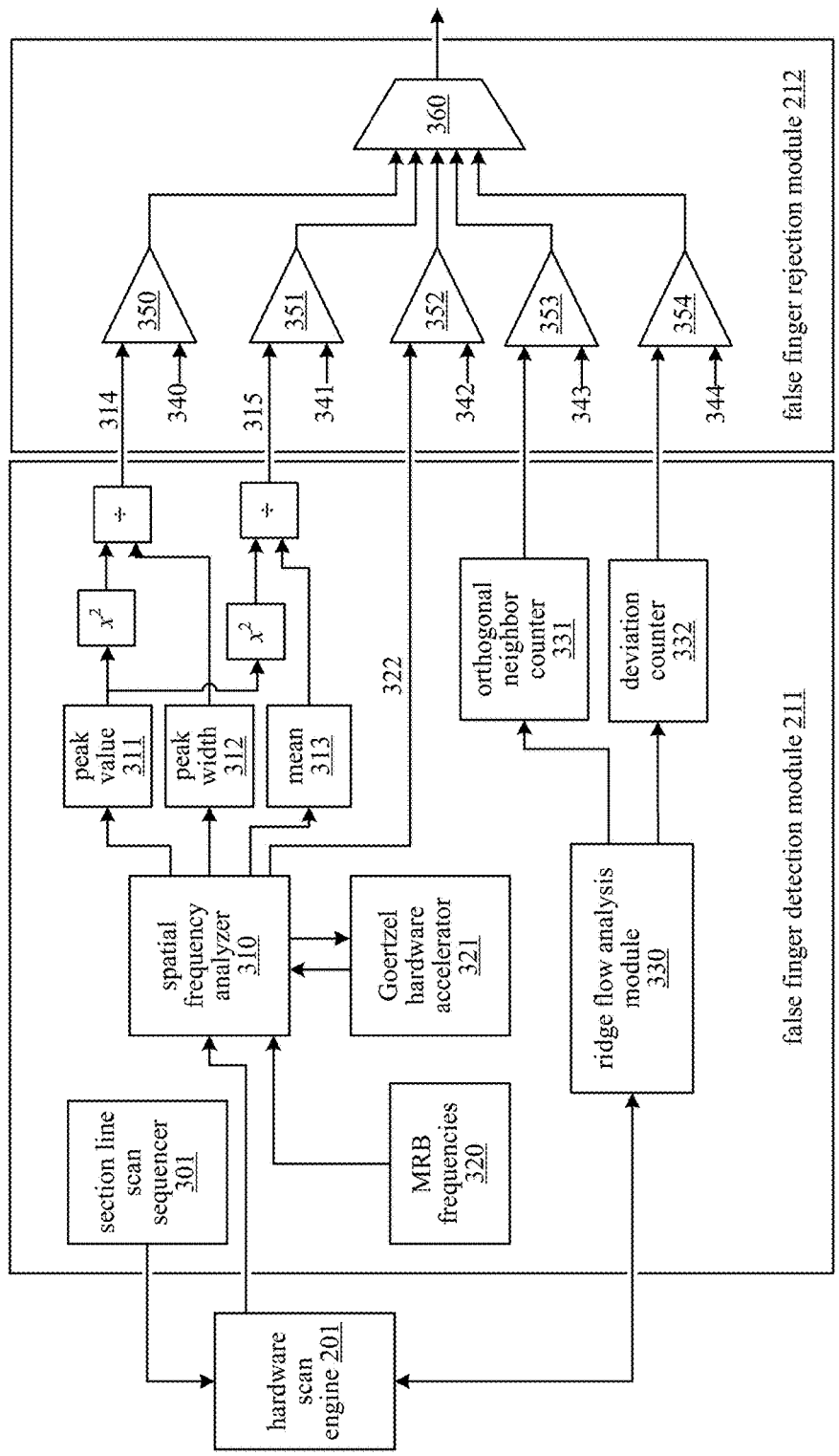
FIG. 3 illustrates false finger detection and rejection modules in a fingerprint sensor controller, according to an embodiment.

FIG. 3 illustrates a functional block diagram of a false finger detection module 211 and a false finger rejection module 212, according to an embodiment. The false finger detection module 211 performs spatial frequency and ridge flow analyses on imaged surface features of an object contacting the fingerprint sensor 130. False finger rejection module 212 determines based on the results of the spatial frequency and ridge flow analyses whether the object at the fingerprint sensor 130 is interpreted as a real finger or a non-finger object.

The false finger detection module 211 includes circuit elements 310-313 for calculating a spatial frequency spectrum from the image data corresponding to a set of section lines of the fingerprint sensor 130. The section line scan sequencer provides a sequence of signals to the hardware scan engine 201 for measuring the set of section lines. For example, one section line may include the unit cells of the fingerprint sensor 130 that are in the same single row. Accordingly, the section line scan sequencer 301 provides the appropriate signals to the hardware scan engine 201 for scanning the sensor electrode intersections corresponding to the row of unit cells. The section line scan sequencer 301 similarly provides signals for scanning other section lines in the set, which may include rows, columns, or other patterns of unit cells.

Once acquired by the hardware scan engine 201, the image data is provided as a set of capacitance count values (representing pixel intensities) to the spatial frequency analyzer 310. The spatial frequency analyzer 310 calculates a spatial frequency spectrum for each of multiple subsets of the data, where each subset represents one of the multiple section lines. In one embodiment, the spatial frequency analyzer 310 generates a spatial frequency spectrum for each subset by performing a discrete Fourier transform (DFT) of the series of count values in the subset. The peak value module 311 determines the highest magnitude (i.e., peak value) in the resulting spatial frequency spectrum, along with the spatial frequency associated with the peak. In one embodiment, the peak value module 311 only considers peaks in the spatial frequency spectrum that correspond to a spatial period between 300 and 700 μm, which is a MRB range of a human finger. Peaks not falling within this range are filtered out.

The peak width module 312 determines the width of the peak at a predetermined height (e.g., half the height of the peak). A first line metric 314 is calculated by scaling the peak based on the peak magnitude value and the peak width; the magnitude is multiplied by a ratio of the magnitude divided by the peak width. The mean module 313 calculates the average magnitude for frequencies within the MRB range. A second line metric 315 is calculated by scaling the peak based on the peak magnitude value and this average magnitude; the peak magnitude is multiplied by a ratio of the peak magnitude divided by the average magnitude for frequencies in the MRB range.

The false finger detection module 211 additionally includes a Goertzel hardware accelerator 321 that is connected to the spatial frequency analyzer 310 and that provides circuitry for generating spatial frequency spectrum information by optionally performing a Goertzel calculation on the series of count values in each subset of image data, where each subset represents a section line. The Goertzel hardware accelerator 321 evaluates individual spatial frequencies of the DFT, and compared to the DFT, can be used to more efficiently calculate magnitudes for each of a smaller number of spatial frequencies. The MRB frequencies block 320 provides one or more frequencies of interest within the MRB range for a human finger to the Goertzel hardware accelerator 321. In one embodiment, the Goertzel hardware accelerator 321 tests each of these one or more frequencies to determine the degree to which each frequency is present in each section line's subset of the image data. The Goertzel calculation for each frequency results in a magnitude value 322 that can be compared to a threshold 342. In alternative embodiments, the Goertzel calculations are used to generate sufficient spectral information so that spectral peaks can be identified and scaled using the modules 331, 312, and/or 313.

The false finger detection module 211 includes a ridge flow analysis module 330 that analyzes the ridge flow characteristics for partial image data captured from a portion of the fingerprint sensor 130. The ridge flow analysis module 330 divides the partial image into a number of regions and determines a ridge direction for each of the regions. For each region that has a ridge direction that is orthogonal to the ridge direction of an adjacent region, the ridge flow analysis module increments the orthogonal neighbor counter 331. For each region that has a ridge direction that differs by more than a predetermined amount from an average ridge direction of all the regions in the partial image, the ridge flow analysis module 330 increments the deviation counter 332.

The false finger rejection module 212 determines based on the outputs of the false finger detection module 211 whether the object detected at the fingerprint sensor 130 is a real finger or a non-finger object. In one embodiment, the false finger rejection module 212 includes a number of comparators 350-354 for comparing the magnitude values and counters with corresponding thresholds 340-344. For example, comparator 350 asserts its output if the first line metric (representing the scaled spatial frequency peak for a section line) exceeds a predetermined threshold. Similarly, comparators 351-354 also assert their respective outputs if their respective input signals exceed the corresponding thresholds 341-344. Each of the thresholds 340-344 can be set independently from each other, and appropriate thresholds for accurately distinguishing fingers from non-finger objects may be determined by a calibration process prior to run time, or may be dynamically adjusted during run time based on feedback from the user or other information.

Multiplexer 360 outputs a value representing a final determination of whether the object is a finger or non-finger object. In one embodiment, multiplexer 360 can be used as a selector to select only one of the signals 314, 315, 322, or counter values 331 and 332 as the determining factor. Alternatively, the multiplexer 360 may generate a result by weighting and summing the signals, then comparing the result to another threshold. The result from multiplexer 360 is transmitted to the state machine 204, which in turn causes the fingerprint sensor controller 120 to continue the process of acquiring a normal image of the finger from the fingerprint sensor 130 to be transmitted to the host device 110. In one embodiment, any of the signals produced by the false finger detection module 211 (e.g., line metrics 314, 315, etc.) or the false finger rejection module 212 (e.g., the outputs of comparators 350-354 or multiplexer 360) can be transmitted to the host device 110 to be used in further processing.

Figure 4:
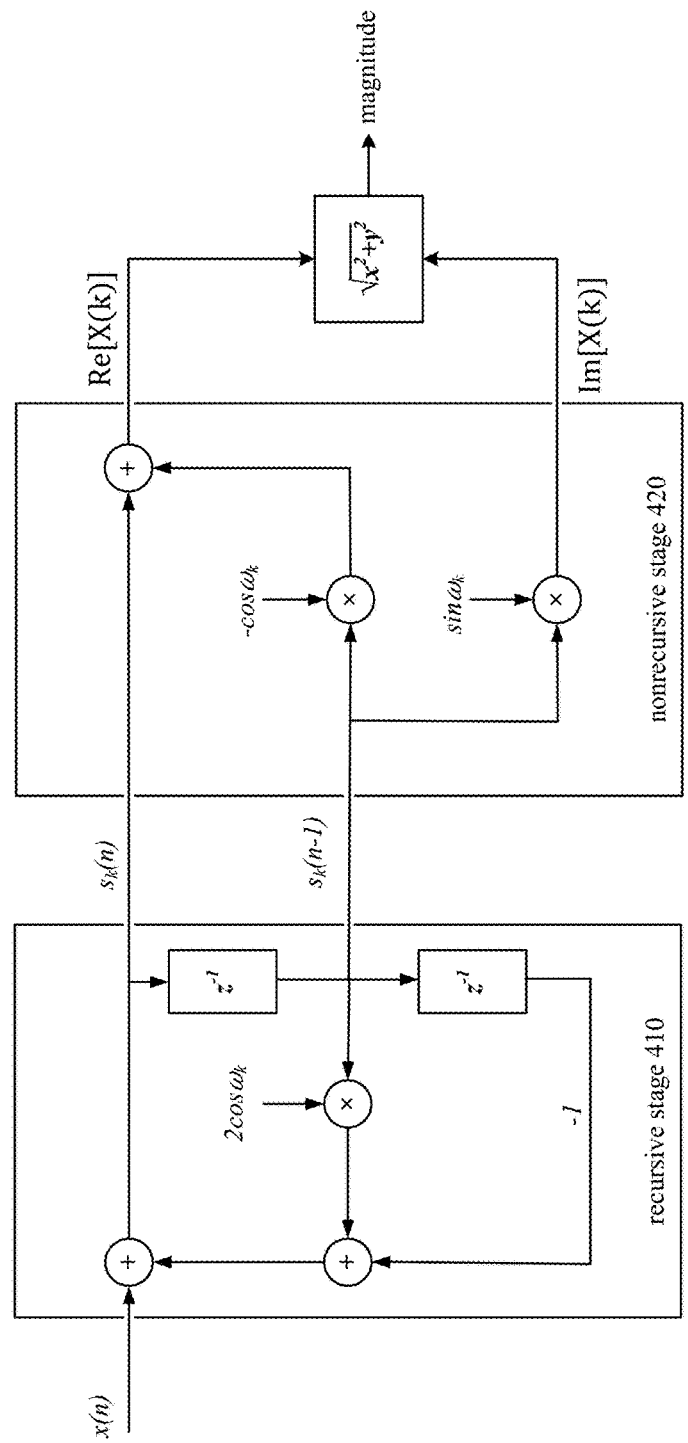
FIG. 4 illustrates an embodiment of a Goertzel hardware accelerator.

FIG. 4 illustrates functional blocks in the Goertzel hardware accelerator circuitry 321, according to an embodiment. The Goertzel hardware accelerator 321 reduces processing time and further allows for processing of up to all of the section lines at once. The recursive stage 410 of the Goertzel hardware accelerator 321 calculates an intermediate sequence s[n], as expressed in Equation 1 below.

$$s_k(n) = x(n) + 2\cos(\omega_k)s_k(n-1) - s_k(n-2) \quad \text{(Equation 1)}$$

The nonrecursive stage 420 applies the filter as expressed in Equation 2 below to the intermediate sequence $s_k(n)$ to generate an output sequence y[n].

$$Re[X(k)] = s_k(n) - s_k(n-1)\cos(\omega_k) \quad \text{(Equation 2)}$$

$$Im[X(k)] = s_k(n-1)\sin(\omega_k) \quad \text{(Equation 3)}$$

A magnitude value for the frequency can be calculated based on the real portion Re[X(k)] and the imaginary portion Im[X(k)].

$$\text{magnitude}^2 = Re[X(k)]^2 + Im[X(k)]^2 \quad \text{(Equation 4)}$$

The Goertzel hardware accelerator 321 as illustrated in FIG. 4 includes circuitry for performing Goertzel calculations for one frequency at a time; thus, calculations for multiple frequencies over the MRB range can be performed serially. In an alternative embodiment, the Goertzel hardware accelerator 321 includes multiple instances of the illustrated circuitry for performing the Goertzel calculations for multiple frequencies over the MRB range in parallel.

Figure 7:
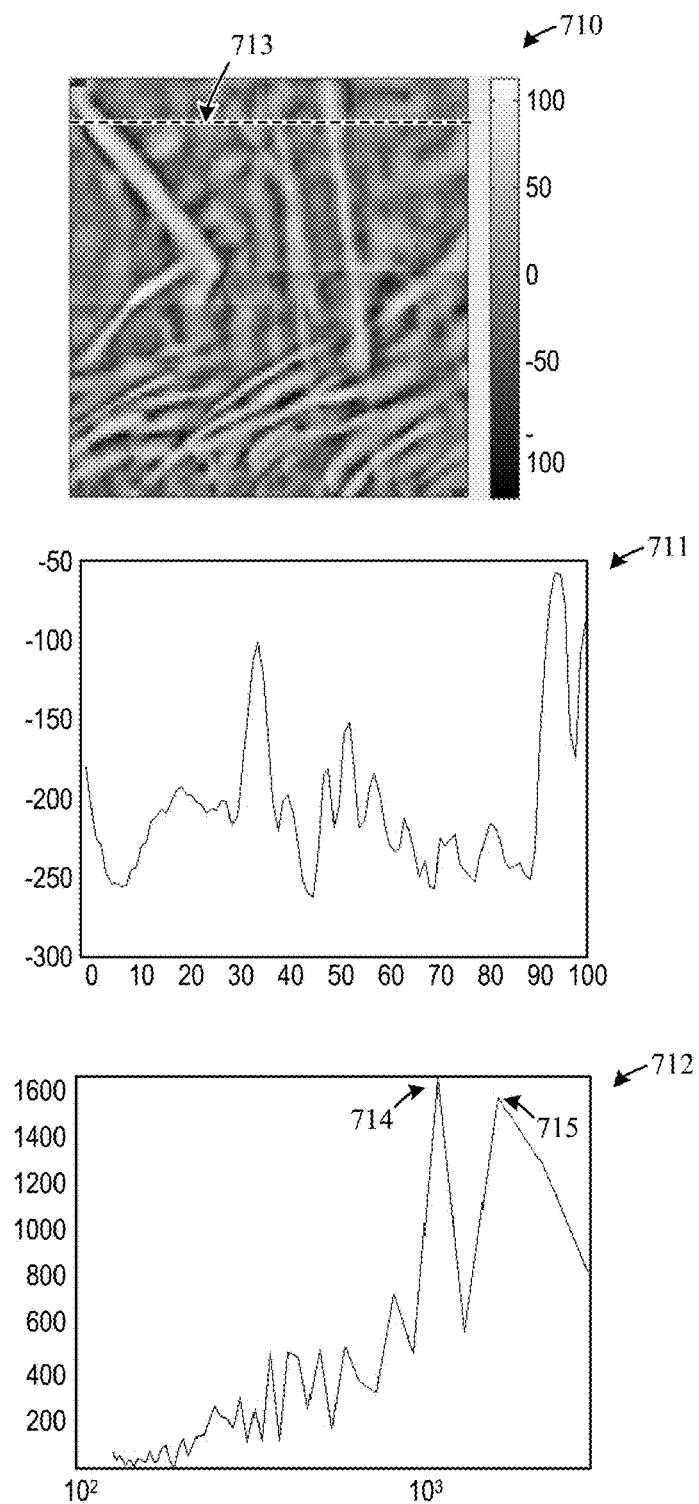
FIG. 7 illustrate full images, section line signals, and spatial frequency spectra for aluminum foil, according to an embodiment.

FIGS. 5A-7 illustrate full images, section line signals, and spatial frequency spectra for different types of touch objects, including two fingers (in FIGS. 5A and 5B), two coins (in FIGS. 6A and 6B), and aluminum foil (in FIG. 7). FIG. 5A illustrates an image 510 captured from a fingerprint sensor 130 of a human index finger, in which lighter values correspond to higher capacitive count values. Graph 511 illustrates a line signal including the values from the image 510 that lie along section line 513. In graph 511, the vertical axis indicates count values (as a difference from average) while the horizontal axis indicates the distance along the section line 513. Graph 512 illustrates a spatial frequency spectrum for the section line signal for section line 513. The spatial frequency spectrum 512 includes a peak 514 corresponding to a spatial period of 650 μm. FIG. 5B illustrates an image 520 captured from a fingerprint sensor 130 of a human thumb, in which lighter values correspond to higher capacitive count values. Graph 521 illustrates a line signal including the values from the image 520 that lie along section line 523. In graph 521, the vertical axis indicates count values while the horizontal axis indicates the distance along the section line 523. Graph 522 illustrates a spatial frequency spectrum for the section line signal for section line 523. The spatial frequency spectrum 522 includes a peak 524 corresponding to a spatial period of 450 μm.

FIG. 6A illustrates an image 610 captured from a fingerprint sensor 130 of a first coin, in which lighter values correspond to higher capacitive count values. Graph 611 illustrates a line signal including the values from the image 610 that lie along section line 613. In graph 611, the vertical axis indicates count values while the horizontal axis indicates the distance along the section line 613. Graph 612 illustrates a spatial frequency spectrum for the section line signal for section line 613. The spatial frequency spectrum 612 includes a peak 614. FIG. 6B illustrates an image 620 captured from a fingerprint sensor 130 of a first coin, in which lighter values correspond to higher capacitive count values. Graph 621 illustrates a line signal including the values from the image 620 that lie along section line 623. In graph 621, the vertical axis indicates count values while the horizontal axis indicates the distance along the section line 623. Graph 622 illustrates a spatial frequency spectrum for the section line signal for section line 623. The spatial frequency spectrum 622 includes a peak 624. The respective peak spatial frequencies 614 and 624 for both of the first and second coins are greater than 900 μm or more.

FIG. 7 illustrates an image 710 captured from a fingerprint sensor 130 of a piece of aluminum foil, in which lighter values correspond to higher capacitive count values. Graph 711 illustrates a line signal including the values from the image 710 that lie along section line 713. In graph 711, the vertical axis indicates count values while the horizontal axis indicates the distance along the section line 713. Graph 712 illustrates a spatial frequency spectrum for the section line signal for section line 713. The spatial frequency spectrum 712 includes peaks 714 and 715, located at 1050 μm and 1400 μm, respectively.

Figure 8A:
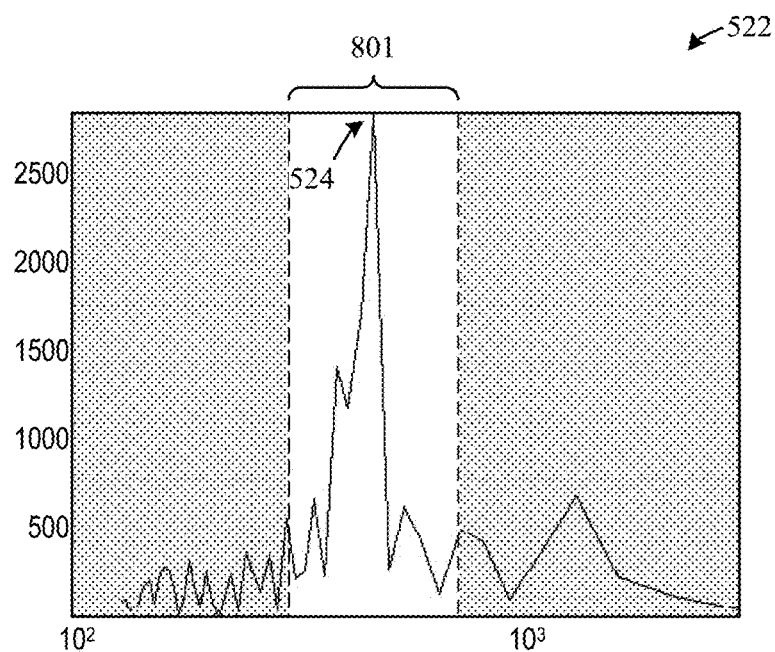
FIGS. 8A-8B illustrate ranges in spatial frequency spectra that correspond to a mean ridge breadth of a human finger, according to an embodiment.
Figure 8B:
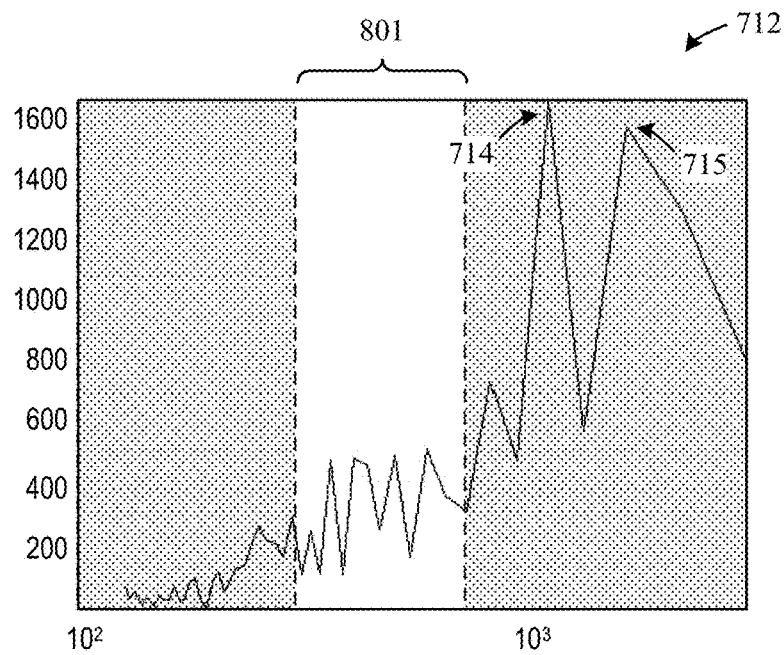

In one embodiment, the fingerprint sensor controller 120 distinguishes non-finger objects from real fingers by determining whether the peak spatial frequency of the object is within the expected MRB range of a human finger. A human finger's mean ridge breadth, which is the average shortest distance between adjacent ridges, lies in the range of 300-500 μm. Since fingerprint ridges are not necessarily orthogonal to the selected section lines, the MRB range may be extended. For fingerprint ridges that are rotated by 45 degrees relative to a section line, the highest ridge breadth in the MRB range can be calculated as $500 \times \sqrt{2} \approx 700$ μm. The peak spatial frequencies for the index finger and thumb (i.e., 650 μm and 450 μm, respectively) are both within the adjusted MRB range of 300-700 μm for human fingers. FIG. 8A illustrates the portions of the spatial frequency spectrum 522 of the thumb that are inside and outside the adjusted MRB range 801. Peak 524 is near the middle of the MRB range 801. The peak spatial frequencies for the non-finger objects (i.e., the coins and aluminum foil) are higher than the MRB range expected for human fingers; thus, these objects can be identified as non-finger objects on this basis. FIG. 8B shows that the peaks 714 and 715 are above the MRB range 801.

In one embodiment, the sharp peaks in the spatial frequency spectrum that are produced by human fingerprints can be scaled to improve the system's responsiveness to finger touches. The peaks are scaled by a ratio of the peak magnitude and the mean value of magnitudes within the MRB range and/or by a ratio of the peak magnitude and the peak width. The scaling is performed by components in the false finger detection module 211, as illustrated in FIG. 3.

In one embodiment, the line metric 315 generated by the false finger detection module 211, as illustrated in FIG. 3, represents a scaled spatial frequency peak for a section line. The line metric 315 can be calculated according to Equation 5 below:

$$\text{lineMetric} = \text{peakVal} \times \text{peakVal} / \text{mean} \quad \text{(Equation 5)}$$

Figure 9:
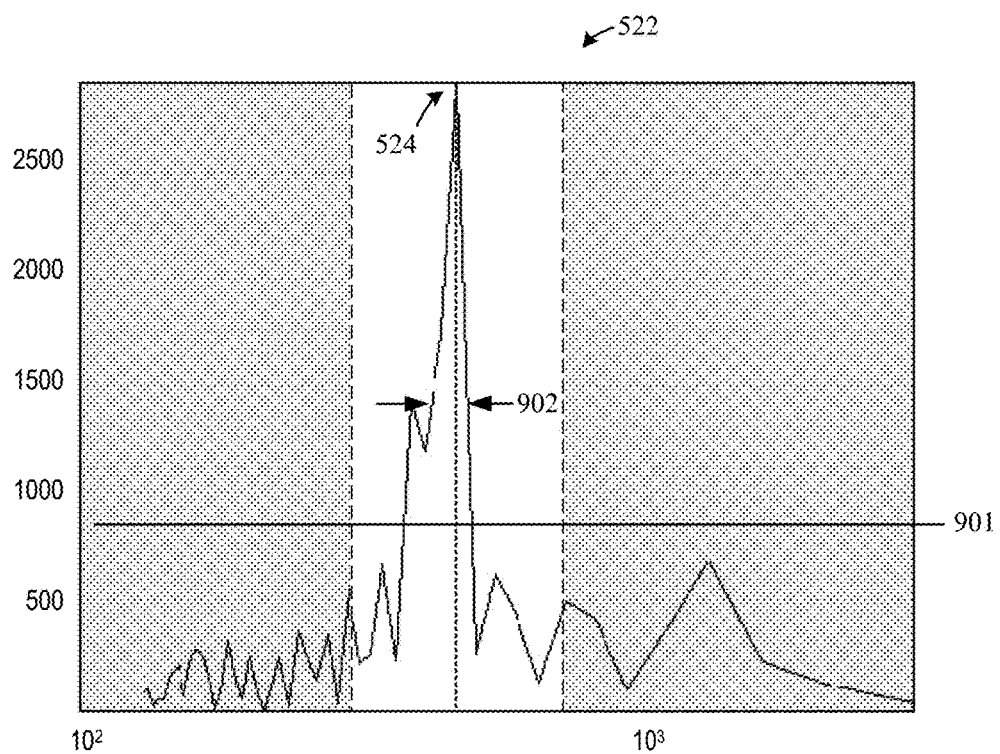
FIG. 9 illustrates features of a spatial frequency peak, according to an embodiment.

In Equation 5, lineMetric represents the line metric 315, peakVal represents the peak magnitude in the spatial frequency spectrum that is within the MRB range, and mean represents the average magnitude value corresponding to spatial frequencies within the MRB range. FIG. 9 illustrates the mean value 901 for the spatial frequency spectrum 522 of the thumb.

Referring to FIG. 3, the line metric 314 generated by the false finger detection module 211 represents a scaled spatial frequency peak for a section line that is scaled by a ratio of the peak magnitude and the peak width. The line metric 314 can be calculated according to Equation 6 below:

$$\text{lineMetric} = \text{peakVal} \times \text{peakVal} / \text{peakWidth} \quad \text{(Equation 6)}$$

In Equation 6, lineMetric represents the line metric 314, peakVal represents the peak magnitude in the spatial frequency spectrum that is within the MRB range, and peakWidth represents the width of the peak. FIG. 9 illustrates the peak width 902 for the peak 524 in the spatial frequency spectrum 522 of the thumb. In one embodiment, the peak width 902 is calculated for a fractional height of the peak; for example, the peak width 902 may be calculated at 50% of the height of peak 524. In other words, the peak width 902 is calculated as the difference between the two spatial frequency values nearest to the spatial frequency value of the peak 524 that have a magnitude of 0.5 times the magnitude of the peak 524. In one embodiment, the thresholds 340 and 341 against which the line metrics 314 and 315 are compared can be adjusted to achieve a desired ratio of false acceptances to false rejections.

In one embodiment, the false finger detection module 211 determines the line metrics 314 and 315 and/or calculates a Goertzel result 322 as described above for each of multiple section lines of an image. A single section line of the image could be used to detect fingerprint ridge structures having a spatial frequency within the MRB range when the ridge structures are not more than 45 degrees from orthogonal to the section line; however, multiple section lines that are orthogonal to each other can be used to detect fingerprint ridge structures that are oriented outside this range.

Figure 10A:
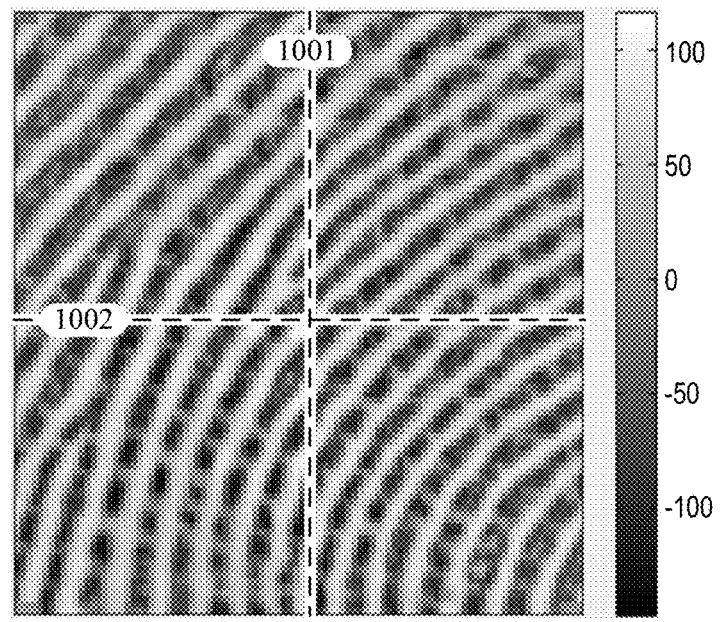
FIGS. 10A-10B illustrate sets of section lines, according to an embodiment.

FIG. 10A illustrates a pair of orthogonal section lines 1001 and 1002 arranged in a cross pattern, according to an embodiment. Section lines 1001 and 1002 are orthogonal to each other. Section line 1001 traverses unit cells of a single column of the fingerprint sensor 130, while section line 1002 traverses unit cells of a single row of fingerprint sensor 130. Accordingly, a subset of image data for section line 1001 includes capacitive count values measured from the unit cells along the section line 1001, while a subset of image data for section line 1002 includes capacitive count values measured from the unit cells along the section line 1002. In one embodiment, the section lines 1001 and 1002 intersect at the center of the active sensing area of fingerprint sensor 130. In one embodiment, the section lines need not extend across the entire sensor array, and each traverse at least two or more unit cells.

Figure 10B:
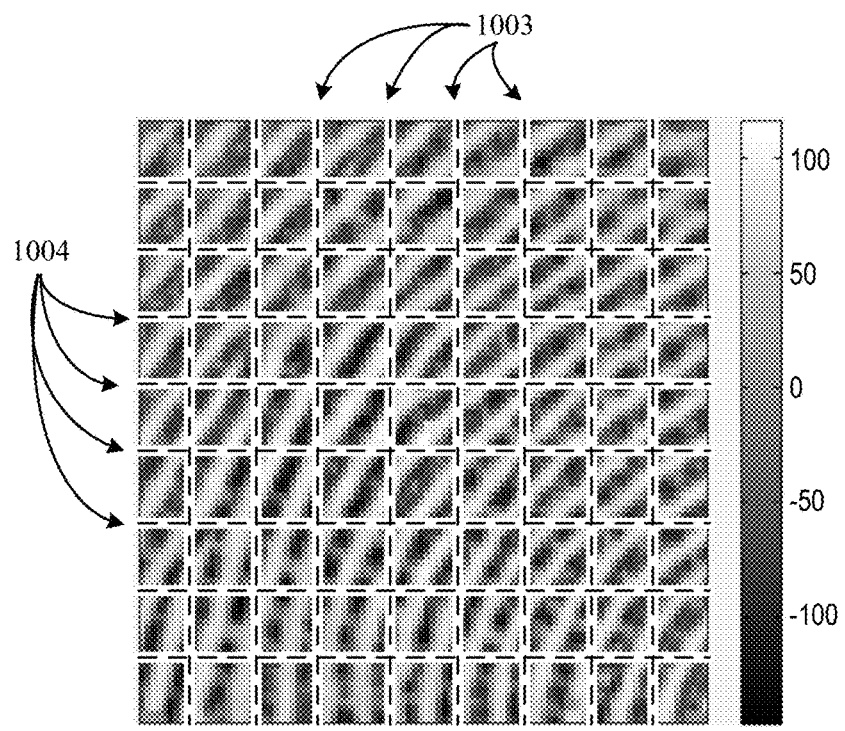

FIG. 10B illustrates multiple section lines arranged in a grid pattern, according to an embodiment. The grid of section lines includes a set of vertical section lines 1003 and a set of horizontal section lines 1004. Each of the vertical section lines 1003 is orthogonal to each of the horizontal section lines 1004. Relative to the cross pattern of section lines, using the grid pattern increases scanning and processing time. However, the grid arrangement of section lines improves the detection of real fingers relative to the cross arrangement in cases where the fingerprint is damaged or contains complicated structures (e.g., loops, whorls, etc.) or where a non-finger object contains fingerprint-like structures that may trigger false detection. In one embodiment, the grid includes eight vertical section lines and eight horizontal section lines, as illustrated in FIG. 10B. In one embodiment, the fingerprint sensor controller 120 processes section lines sequentially, with the spatial frequency analysis being accomplished with a processing time within 0.5 milliseconds per section line. For a grid of 16 lines, the total scan and processing time could be accomplished within 30 ms.

Alternative scan patterns may be used that include a greater number of section lines, or section lines that are oriented at different angles. A greater number of section lines improves detection accuracy while increasing processing time. In alternative embodiments, the processing for section lines is performed in parallel, rather than sequentially.

In alternative embodiments, two-dimensional processing to determine the peak spatial frequencies can be performed within a data captured from a window (e.g., 10×10 pixels) of the image instead of from section lines. In an alternative embodiment, the fingerprint sensor controller 120 may identify ridges and valleys in the image and measure the MRB for the image instead of performing a DFT or Goertzel analysis.

In addition to the spatial frequency analysis, the false finger detection module 211, as illustrated in FIG. 3, also distinguishes between real fingers and non-finger objects based on a ridge flow analysis performed by the ridge flow analysis module 330. From the hardware scan engine 201, the ridge flow analysis module 330 receives data from a partial scan of the fingerprint sensor 130. For example, a portion including 27×27 unit cells of the sensor may be scanned to generate a partial image of 27×27 pixels. The partial image is further processed as a series of smaller regions to determine a ridge direction for each region. For example, the partial image may be divided into nine regions, each including an area of 9×9 pixels, and a ridge direction may be determined for each of the nine regions.

Figure 11:
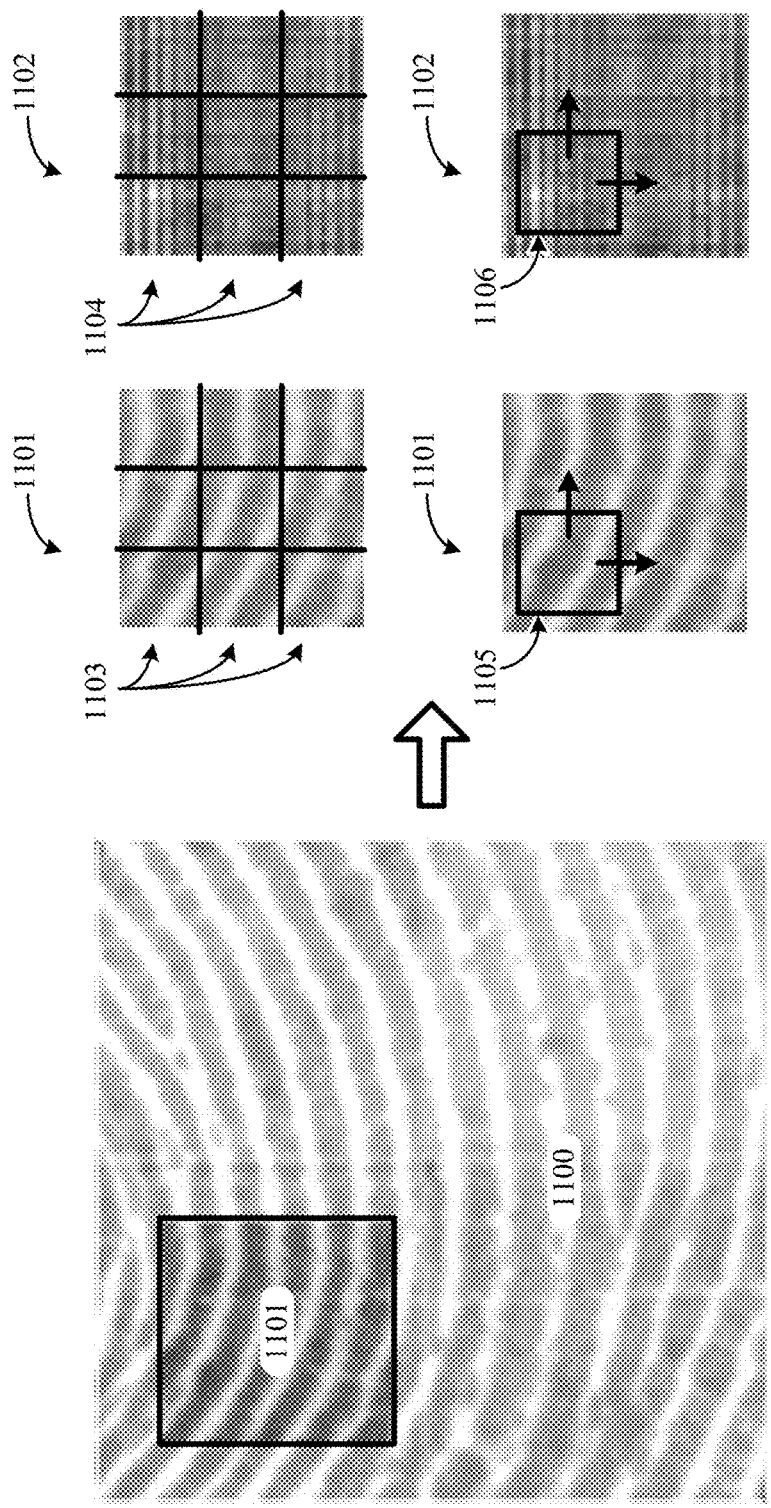
FIG. 11 illustrates regions and moving windows for partial images captured from a fingerprint sensor, according to an embodiment.

FIG. 11 illustrates a partial image 1101 representing a portion of a full image 1100 of a fingerprint. Partial image 110 is further divided into a set of nine regions 1103. The ridge flow analysis module 330 determines a ridge direction for each of the regions 1103. Alternatively, the ridge flow analysis module 330 may determine a ridge direction for each of a number of positions of a moving window 1105. These positions may be offset in the horizontal and/or vertical directions relative to the illustrated position of moving window 1105, and different positions of the moving window 1105 may overlap with each other. Each of the pixels in the partial image 1101 is included in at least one of the window positions.

Partial image 1102 includes a portion of an image of a non-finger object. The partial image 1102 is similarly divided into regions 1104 and a ridge direction is determined for each of the regions 1104. Alternatively, a ridge direction can be determined for each of a number of positions of a moving window 1106. These positions may be offset in the horizontal and/or vertical directions relative to the illustrated position of moving window 1106, and different positions of the window 1106 may overlap with each other. Each of the pixels in the partial image 1102 is included in at least one of the window positions.

Figure 12:
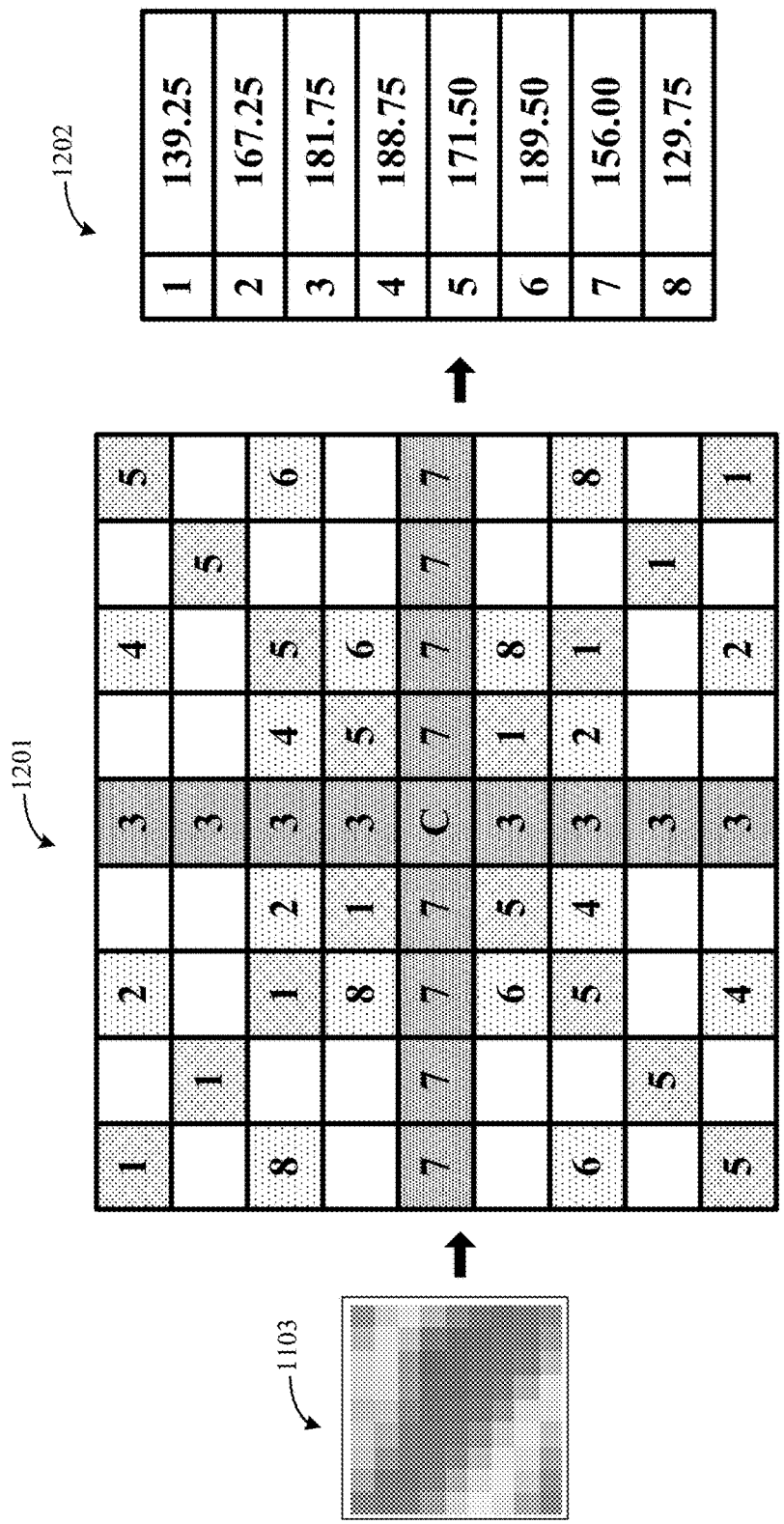
FIG. 12 illustrates a direction mask for an image region, according to an embodiment.

FIG. 12 illustrates a direction mask 1201 for one of the regions 1103 in the partial image 1100, according to an embodiment. The direction mask 1201 is used to determine a ridge direction for the region 1103. The direction mask 1201 includes eight directional segments for the region 1103. Each of the directional segments includes a subset of the pixels in the 9×9 pixel region 1103. Each directional segment includes the pixels located along one of eight axes each oriented in a different direction and intersecting at a center pixel. In one embodiment, the axes are rotated about the center pixel in 22.5 degree increments. Accordingly, each axis is rotated by 22.5 degrees relative to a nearest adjacent axis. As illustrated in FIG. 12, each pixel is labeled with a number corresponding to a directional segments with which the pixel is associated, or is unlabeled if it is not associated with a directional segment. For example, each of the pixels labeled '7' is associated with directional segment 7. The center pixel 'C' is included in all of the directional segments 1-8. In alternative embodiments, some pixels may be associated with more than one directional segment.

Table 1202 indicates average pixel intensity values for each directional segment 1-8, as calculated by the ridge flow analysis module 330. The values in table 1202 are calculated by, for each directional segment, averaging the intensities of the pixels included in the directional segment. Accordingly, directional segment 1 has an average pixel intensity of 139.25, directional segment 2 has an average pixel intensity of 167.25, and so on. In embodiments where each directional segment has the same number of pixels, a sum of the pixel intensities for each directional segment can be calculated, rather than an average.

When the directional segment is located along a ridge or valley structure, the sum or average of the pixel intensities for the directional segment is a maximum or minimum, respectively, relative to the other directional segments for the region. Accordingly, a ridge direction for the region is determined by, if the intensity of the center pixel 'C' is lower than an average intensity of pixels in the region, identifying a direction corresponding to the directional segment having a lowest sum or average as the ridge direction of the region, and if the intensity of the center pixel 'C' is higher than the average intensity of pixels in the region, identifying the direction corresponding to a directional segment having the highest sum or average as the ridge direction of the region. For example, since the center pixel 'C' as illustrated in FIG. 12 has an intensity that is lower than average ('C' is a relatively dark pixel), the directional segment 8, having the lowest average pixel intensity is identified as indicating the ridge direction of the region 1103. A similar process can be used whether determining the ridge direction of a region such as region 1103 or a moving window such as moving window 1105.

Figure 13A:
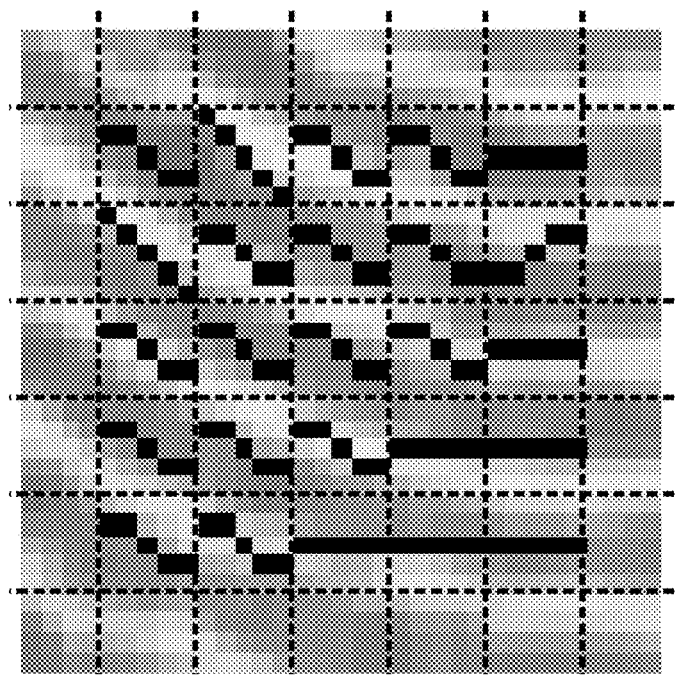
FIGS. 13A and 13B illustrate calculated ridge directions for image regions of a finger and a non-finger object, according to an embodiment.
Figure 13B:
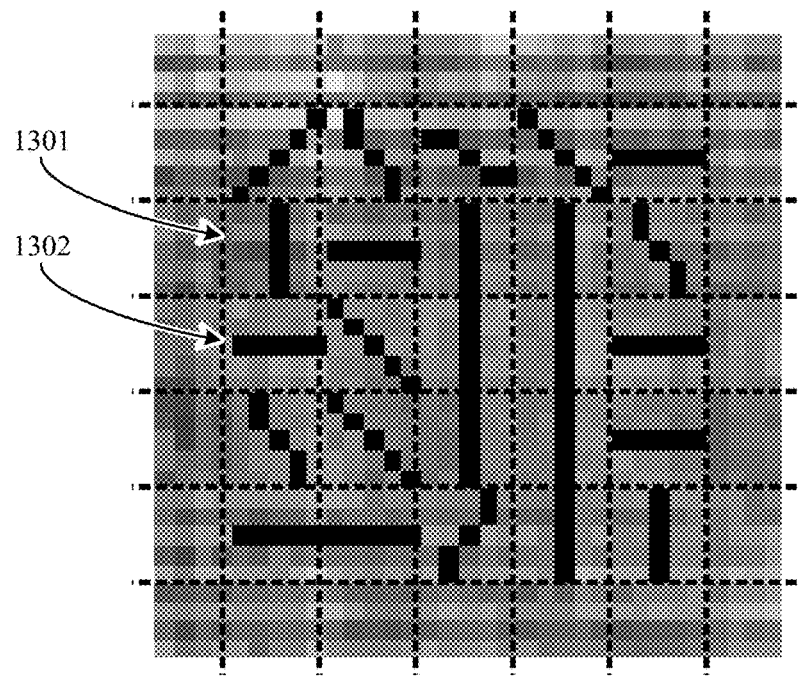

FIGS. 13A and 13B illustrate the determined ridge directions for the regions of a real finger and a non-finger object, respectively, according to an embodiment. In FIGS. 13A and 13B, the directional segments corresponding to the determined ridge directions for each region are darkened. In one embodiment, the false finger detection module 211 generates two different metrics based on these determined ridge directions that can be used to determine whether the imaged object is a real finger or a non-finger object.

First, the ridge flow analysis module 330 determines for each region whether the ridge direction of the region is orthogonal to the ridge direction of any adjacent region that borders the region. With reference to FIG. 13A illustrating the ridge directions for regions of a finger image, none of the regions has a ridge direction that is orthogonal to the ridge direction of an adjacent region. In contrast, FIG. 13B illustrating the ridge directions for regions of a non-finger object includes multiple regions having ridge directions that are orthogonal to the ridge directions of adjacent regions. For example, the ridge direction of region 1301 is orthogonal to the ridge direction of region 1302. In one embodiment, orthogonal neighbor counter 331 records the number of regions in the partial image having a ridge direction that is orthogonal to that of an adjacent region.

Second, the ridge flow analysis module 330 determines for each region whether the ridge direction of the region differs from an average ridge direction of the regions in the partial image by more than a threshold amount. With reference to FIG. 13A, the ridge directions for the finger are less varied than the ridge directions for the non-finger object, as illustrated in FIG. 3B. Accordingly, a threshold can be selected for which each of the ridge directions for the finger does not differ from the average ridge direction by more than the threshold, while at least one of the ridge directions for the non-finger object differs from the average ridge direction by more than the threshold. In one embodiment, deviation counter 332 records the number of regions having a ridge direction that differs from the average ridge direction by more than the threshold.

With reference to FIG. 3, the values recorded by the orthogonal neighbor counter 331 and the deviation counter 332 can be used as weighted factors for determining whether the imaged object is a finger or a non-finger object. In one embodiment, the counter 331 and 332 values are compared to their respective thresholds 343 and 344 and the comparison results are used to make the determination. In one embodiment, the imaged object is rejected as a non-finger object if any of the ridge directions is orthogonal to an adjacent ridge direction, or if any of the ridge directions differs from the average ridge direction by more than the threshold amount.

Figure 14A:
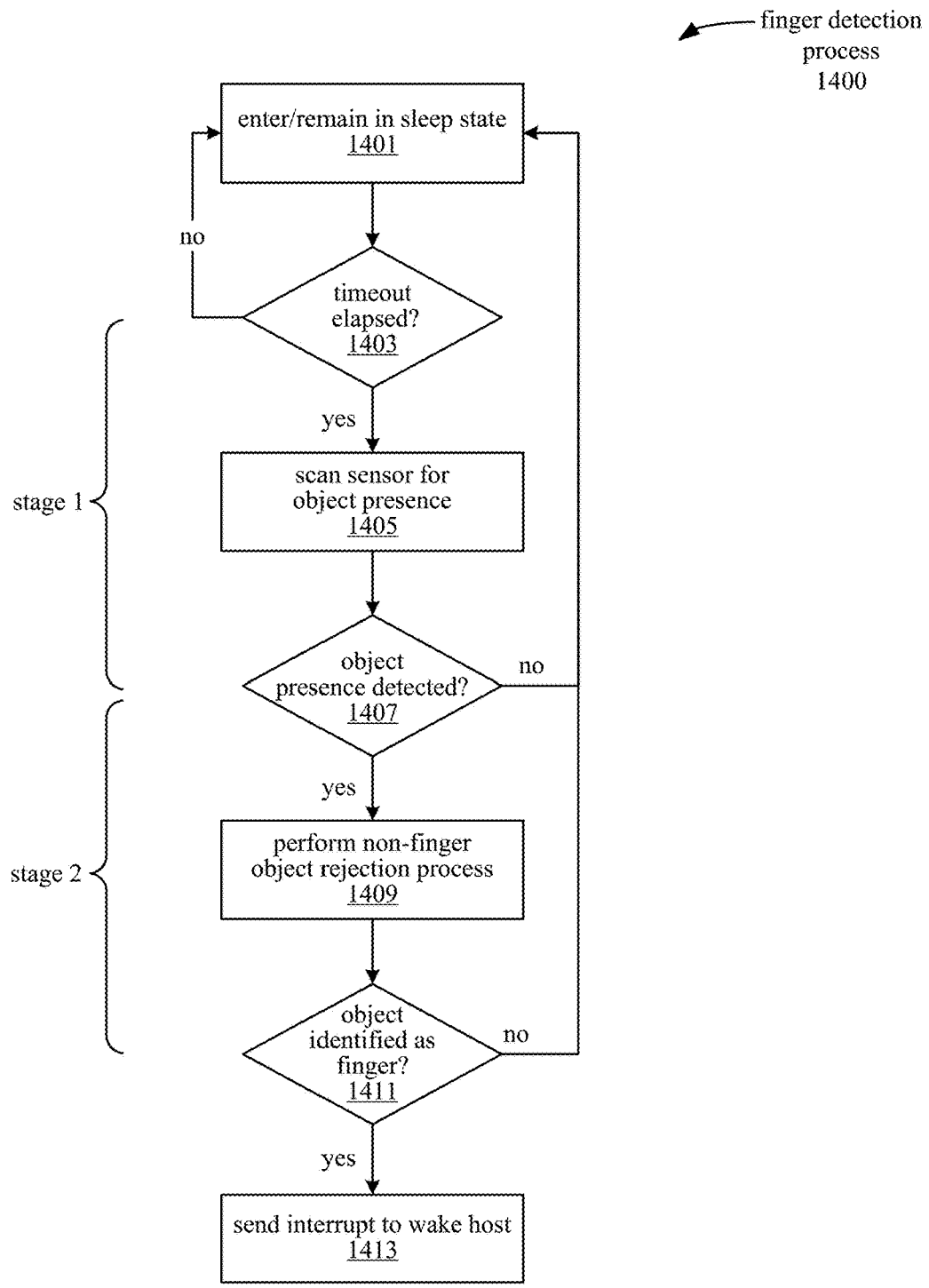
FIG. 14A illustrates a finger detection process, according to an embodiment.

FIG. 14A illustrates a finger detection process 1400, according to an embodiment. The finger detection process 1400 is performed by the fingerprint sensor controller 120. Process 1400 is a two-stage process for determining whether an imaged object is a finger or a non-finger object. Stage 1 is a touch detection process that detects the presence of an object at the fingerprint sensor 130 based on a change in capacitance of one or more of the sensor electrodes in the sensor 130. Stage 2 is initiated in response to detecting an object at the sensor 130 in stage 1, and includes scanning a partial image of the object and processing the data to determine whether the object is a human finger.

During the execution of process 1400, the fingerprint sensing system 100 as a whole may be operating in a normal high power consumption state (e.g., the Advanced Configuration and Power Interface (ACPI) G0 'Working' state), or can remain in a low power consumption sleep state (e.g., the ACPI G1 "Sleeping" state. If the system 100 is in a low power consumption state, the fingerprint sensor controller 120 also remains in a low power consumption state except when periodically waking in order to scan the fingerprint sensor 130 to determine if an object is contacting or in proximity to the sensor 130, and to determine if a detected object is a finger, according to process 1400.

Process 1400 begins at block 1401. At block 1401, the fingerprint sensor controller 120 either enters or remains in a low power sleep state. The low power sleep state is a power state in which the controller 120 consumes less power than during normal operation (e.g., "wake" or "working" states).

At block 1403, if a timeout period has not elapsed, the fingerprint sensor controller 120 takes no action, and the system 100 remains in the sleep state in accord with block 1401. At block 1403, if the timeout period has elapsed, the process 1400 continues at block 1405. At block 1405, the fingerprint sensor controller 120 performs a touch detection scan of the fingerprint sensor 130 to determine whether an object is present at (i.e., contacting or proximate to) the sensor 130. In one embodiment, this scan may include measuring the self or mutual capacitances of one or more of the sensor electrodes of the sensor 130. In one embodiment, multiple sensor electrodes are electrically coupled together and a collective capacitance is measured for the coupled set of sensor electrodes.

At block 1407, if no object is detected at the fingerprint sensor 130, the process 1400 continues back to block 1401 and the system 100 returns to the low power consumption sleep state. At block 1407, if the fingerprint sensor controller 120 detects the presence of an object at the sensor 130, the process 1400 continues at block 1409. At block 1409, the fingerprint sensor controller 120 performs a process for recognizing and rejecting non-finger objects. In one embodiment, the operations of block 1409 include acquiring image data for the object based on signals from the fingerprint sensor 130 and processing the image data to determine if the object is a human finger.

At block 1411, if the fingerprint sensor controller 120 fails to identify the object as a finger, the process 1400 continues back to block 1401, and the system 100 returns to the low power consumption sleep state. However, if at block 1411 the object is identified as a finger according to the process at block 1409, then an interrupt is transmitted to the host 110, as provided at block 1413. In one embodiment, the interrupt causes the host device 110 to transition from a low power consumption sleep state (e.g., an ACPI C3 power state) to a higher power consumption state, such as a normal operating state (e.g., an ACPI C0 power state). In one embodiment, the interrupt also initiates further actions to be performed by the host device 110. For example, since the object is determined to be a real finger, the host 110 may receive image data from a full scan of the object and perform fingerprint matching based on the image data.

Figure 14B:
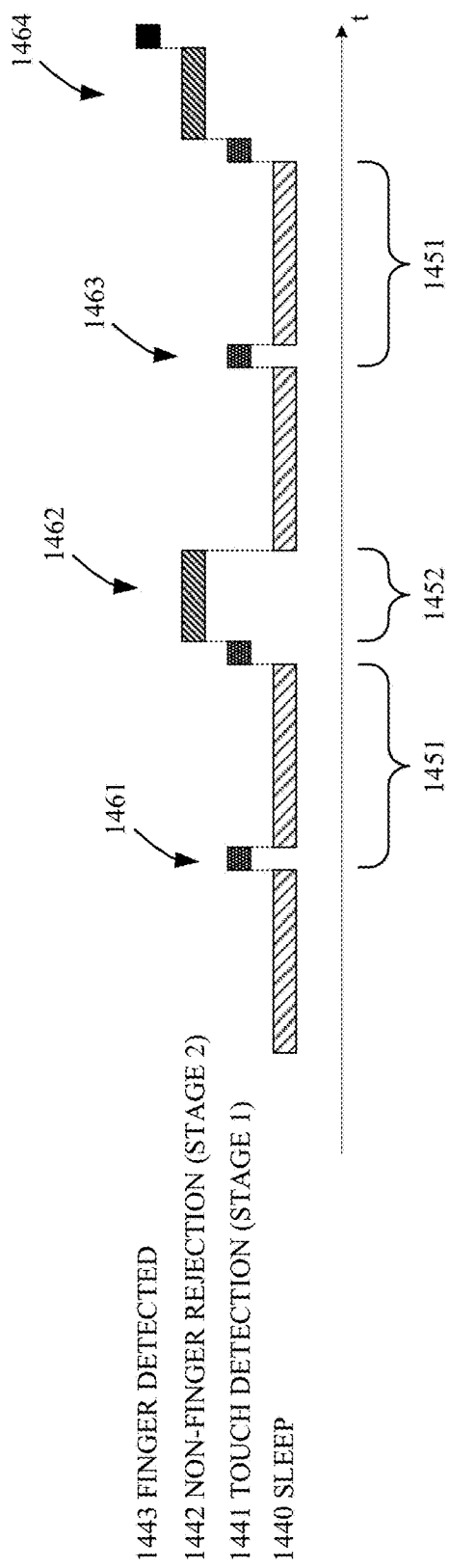
FIG. 14B illustrates a timing diagram for a finger detection process, according to an embodiment.

FIG. 14B is a timing diagram illustrating exemplary operations of process 1400, according to an embodiment.

FIG. 14B illustrates four different stages of activity 1440-1443, each illustrated at a different height above the horizontal time axis 't', which represents increasing time from left to right. The 'sleep' stage 1440 corresponds to blocks 1401 and 1403 of process 1400 while the timeout period at block 1403 has not been reached. The 'touch detection' stage 1441 and the 'non-finger rejection' stage 1442 correspond to stage 1 and stage 2, respectively, of process 1400. The 'finger detected' stage 1443 corresponds to blocks 1411 (when the object is identified as a finger) and 1413. In one embodiment, the activities 1440-1443 are arranged in order of increasing power consumption from bottom to top, with the 'sleep' stage 1440 consuming the least power. The 'finger detected' stage 1443 and host activity resulting from the stage 1443 consumes the most power.

Events 1461 and 1463 occur when the timeout has elapsed at block 1403, and the resulting scan 1405 does not detect an object at the sensor 130. From block 1407, the process 1400 returns to block 1401 when no object is detected at the sensor 130. FIG. 14B illustrates the touch detection scan period 1451, which represents the time between sequential touch detection scans. In one embodiment, the touch detection scan period is 100 milliseconds.

Event 1462 occurs when the timeout has elapsed at block 1403, the resulting scan 1405 detects the presence of an object at the sensor 130, and the non-finger object recognition process 1409 determines that the detected object is not a finger. In one embodiment, the time 1452 for scanning and processing that occurs during the 'non-finger rejection' stage 1442 is less than 30 milliseconds. In the case of event 1462, the process 1400 returns from block 1411 to block 1401 since the detected object is identified as a non-finger object.

Event 1464 occurs when the timeout has elapsed at block 1403, the resulting scan 1405 detects the presence of an object at the sensor 130, and the non-finger object recognition process 1409 determines that the detected object is a finger. In this case, the process 1400 continues from block 1411 to block 1413. The fingerprint sensor controller 120 sends an interrupt to the host device 110, in accord with block 1413. The host device 110 is thus notified via the interrupt that a real finger has been detected and full image scanning is initiated to acquire an image of the finger that can be used by the host device 110 for fingerprint matching. If the host device 110 is in a sleep state, the host device 110 transitions to a higher power consumption state in response to receiving the interrupt. In one embodiment, the non-finger object rejection stage 1442 is performed by the fingerprint sensor controller 120 without interrupting or waking the host device 110, and without any input from the host device 110.

Figure 15:
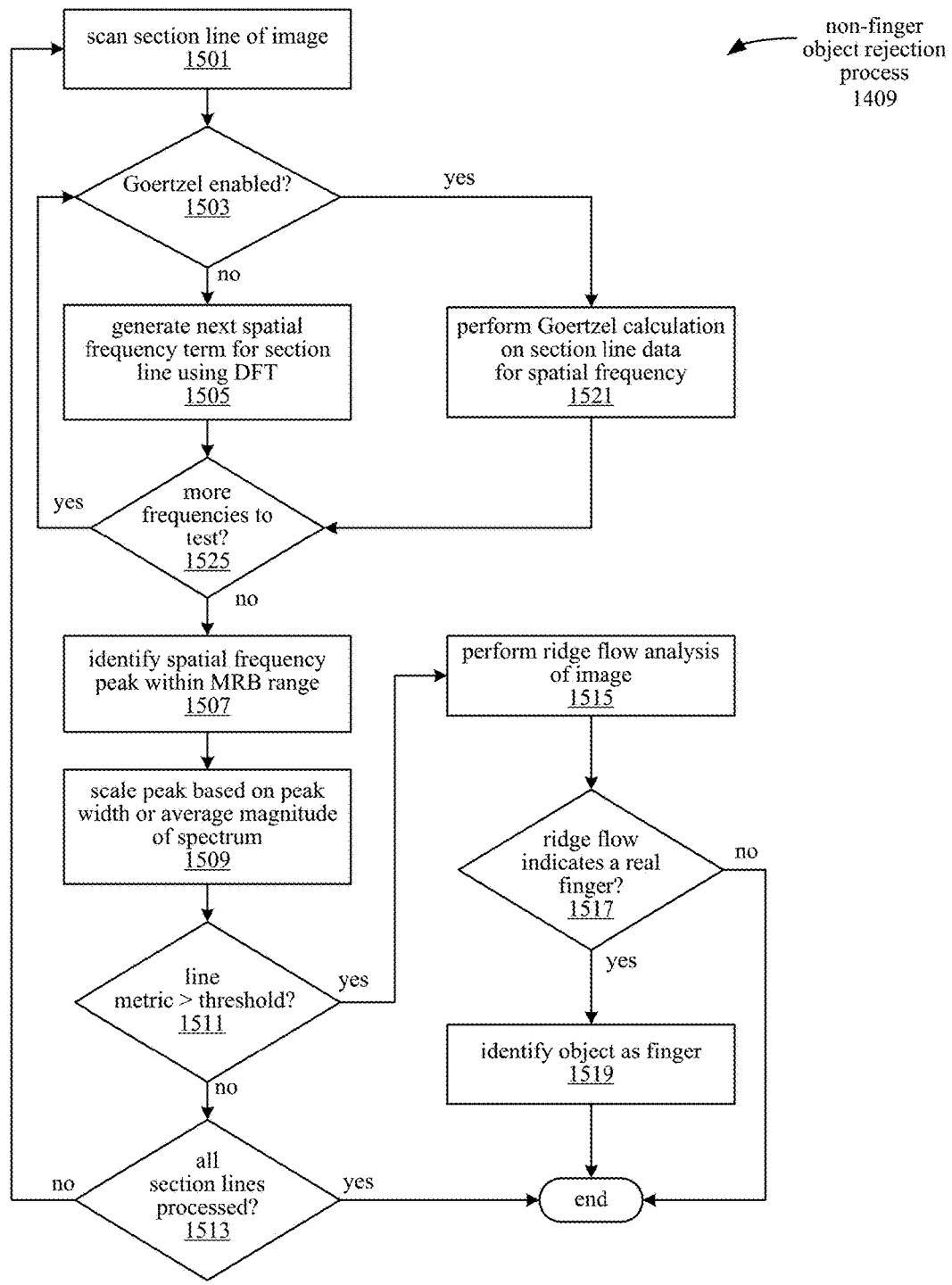
FIG. 15 illustrates a process for detecting a non-finger object, according to an embodiment.

FIG. 15 illustrates a process 1409 for rejecting non-finger objects, according to an embodiment. Process 1409 corresponds to block 1409 in process 1400, and is performed by the false finger detection module 211 and the false finger rejection module 212 of the fingerprint sensor controller 120, as illustrated in FIGS. 2 and 3. The process 1409 is performed in response to detecting the presence of an object at the fingerprint sensor 130, and operates to capture a set of image data of the object and use the image data to determine whether the object is a human finger or a non-finger object.

At block 1501, the false finger detection module 211 captures a first subset of the image data, including intensity values measured from unit cells along a corresponding section line across the fingerprint sensor 130. The section line is one of a number of section lines 1003 and 1004, as illustrated in FIG. 10B, and is orthogonal to other section lines, each representing other different subsets of the image data. From block 1501, the process 1409 continues at block 1503.

At block 1503, if the Goertzel calculation is not enabled, the process 1409 continues at block 1505. At block 1505, the spatial frequency analyzer 310 of the false finger detection module 211 calculates the next term in a spatial frequency spectrum that includes multiple terms for the subset of image data of the section line that was captured at block 1501. Each of the terms in the spatial frequency spectrum corresponds to a different spatial frequency. At block 1525, if more frequency terms remain to be calculated, the process 1409 returns to block 1503. The process 1409 thus repeats blocks 1503, 1505, and 1525 to generate all the terms in the spatial frequency spectrum. In one embodiment, the spatial frequency analyzer 310 performs a discrete Fourier transform (DFT) on the subset of image data to generate the spatial frequency spectrum for the section line. Examples of spatial frequency spectra are provided as graphs 512, 522, 612, 622, and 712 in FIGS. 5A-7. At block 1525, when no more frequency terms remain to be calculated, the process 1409 continues at block 1507.

Referring back to block 1503, if the Goertzel calculation is enabled, the process 1409 continues from block 1503 to block 1521. At block 1521, the Goertzel hardware accelerator 321 performs Goertzel calculations on the subset of image data for the section line as an alternative to the DFT for generating the spatial frequency spectrum for the section line. In one embodiment, the Goertzel calculation may be performed in parallel with the generation of the spatial frequency spectrum via DFT. The Goertzel calculations are performed for one or more spatial frequencies within the MRB range of a human finger, and generate a resulting magnitude value 322 for each spatial frequency within the MRB range that is tested. This Goertzel result 322 indicates a degree to which the tested frequency is present in the subset of image data for the section line. At block 1525, if the Goertzel calculation has not yet been performed for all of the spatial frequencies in the MRB range that are to be tested, the process 1409 returns via block 1503 to block 1521 to test the next spatial frequency. The process 1409 repeats blocks 1503, 1521, and 1525 in a loop until all of the spatial frequencies of interest have been tested by the Goertzel calculation for the current section line. At block 1525, if all the spatial frequencies have been tested, the process 1409 continues at block 1507.

At block 1507, the peak value module 311 of the false finger detection module 211 identifies a spatial frequency peak in the spectrum (generated by the DFT, Goertzel, or other spectral analysis) that falls within the MRB range for a human finger. In one embodiment, the MRB range corresponds to a spatial period between 300 and 700 μm.

At block 1509, the false finger detection module 211 scales the identified spatial frequency peak based on the peak width and based on an average magnitude of the spectrum. In order to scale the peak based on the peak width, the peak magnitude value as provided by module 311 is squared and divided by a peak width value provided by the module 312. The resulting line metric 314 has a magnitude that is proportional to the square of the magnitude of the peak and is inversely proportional to a width of the peak. In order to scale the peak based on the average magnitude of the spectrum, the peak magnitude value as provided by module 311 is squared and divided by the average magnitude of the spectrum as provided by module 313. The resulting line metric 315 has a magnitude value that is proportional to the square of the magnitude of the peak and is inversely proportional to a mean magnitude value of the spatial frequency spectrum. As a result, two line metric values 314 and 315 are calculated for the section line, where each value 314 and 315 corresponds to a spatial frequency in the spectrum that lies within the MRB range of a finger.

At block 1511, one or both of these line metric values are compared with corresponding threshold values. In particular, the line metrics 314 and 315 are compared with thresholds 340 and 341 by comparators 350 and 351, respectively. In one embodiment, a Goertzel result 322 may also be compared with its corresponding threshold 342 by comparator 352. If none of these line metrics exceeds its threshold, the process 1409 continues at block 1513. At block 1513, if image data has not been acquired and processed for all of the section lines, the process 1409 continues back to block 1501 to scan the sensor 130 to acquire the next subset of image data for the next section line. Accordingly, process 1409 may repeat blocks 1501-1513, 1521, and 1525 until all of the section lines have been processed. In alternative embodiments, the section lines may be scanned in parallel rather than serially, as illustrated in FIG. 15.

In one embodiment, if one or more of the line metrics 314 and 315 generated by the spatial frequency analyzer 310 via DFT or Goertzel analysis exceeds its corresponding threshold at block 1511, and/or if the magnitude of a Goertzel result 322 exceeds its corresponding threshold 342, then the process 1409 performs a ridge flow analysis at block 1515 to further verify that the object is a real finger. With reference to FIG. 11, in one embodiment, the ridge flow analysis 1515 includes scanning the sensor 130 to acquire additional partial image data 1101 from a portion of the sensor 130, then determining a ridge direction for each of multiple regions 1103 in the partial image 1101, or for each of multiple positions of a moving window 1105 within the partial image 1101. The ridge directions for each region or position are then analyzed to determine whether they differ by more than a threshold amount from the ridge direction of an adjacent region or position, or differ by more than a threshold amount from an average ridge direction within the partial image 1101. A greater number of regions or positions having ridge directions that exceed these thresholds tends to indicate that the imaged object is not a finger.

At block 1517, if the ridge flow analysis 1515 indicates that the object is a real finger, then the object is identified as a real finger, as provided at block 1519. Accordingly, the object is identified as a finger based on comparing magnitude values resulting from spectral analysis (i.e., the line metrics 314 and 315 and the Goertzel result 322) to their corresponding thresholds, and additionally based on the ridge flow analysis. Based on this result, the fingerprint sensor controller 120 sends an interrupt to the host 110, as provided at block 1413 of process 1400. At block 1517, if the ridge flow analysis 1515 indicates that the object is a non-finger object, the process 1409 ends until it is restarted by the operation of process 1400.

Figure 16A:
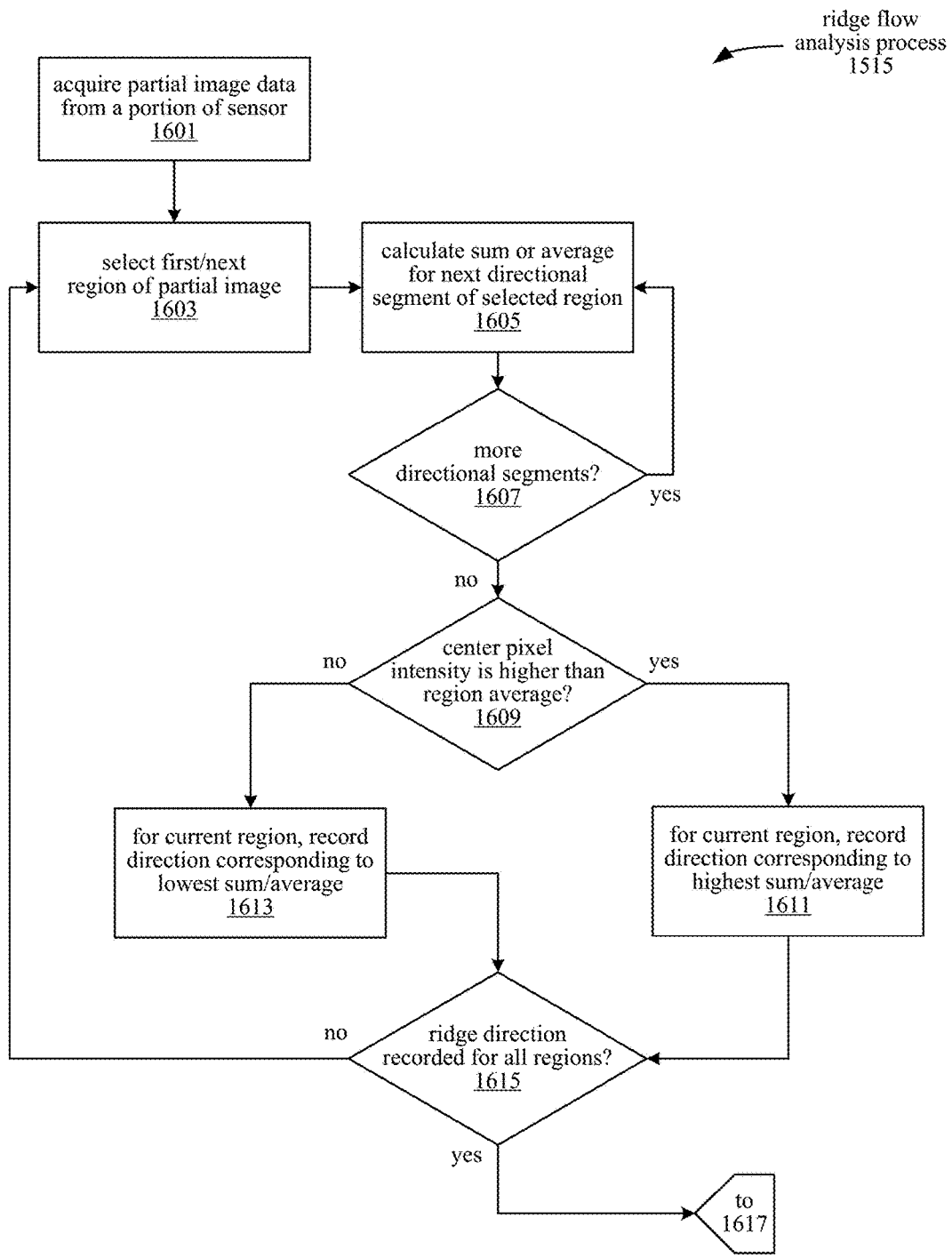
FIGS. 16A and 16B illustrate a ridge flow analysis process, according to an embodiment.
Figure 16B:
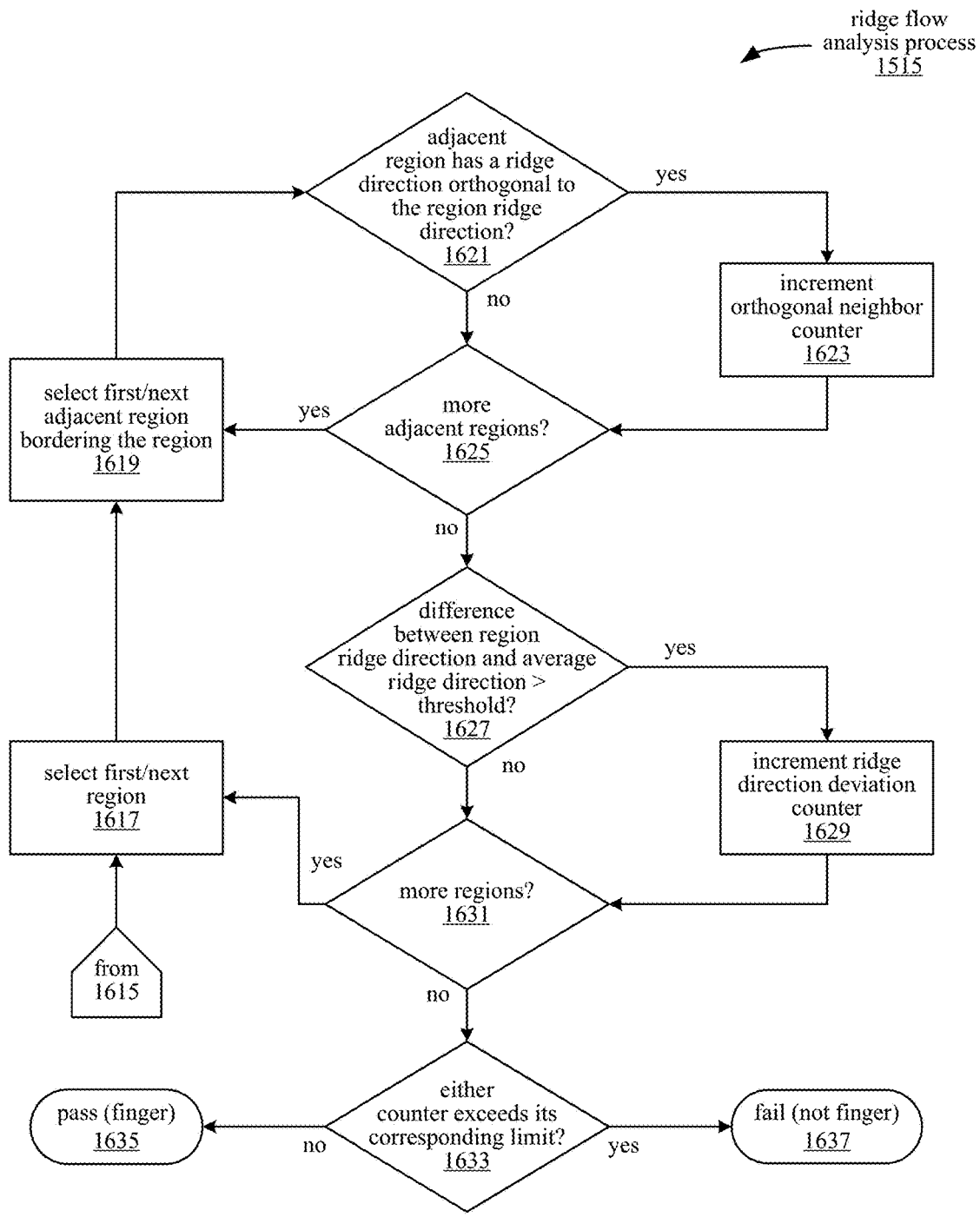

FIGS. 16A and 16B illustrate a ridge flow analysis process 1515, according to an embodiment. The process 1515 corresponds to block 1515 of process 1409. The ridge flow analysis process 1515 is performed by the ridge flow analysis module 330 of the false finger detection module 211. In one embodiment, the ridge flow analysis process 1515 analyzes the image data for a portion (e.g., partial image 1101) of a full image 1100 of the object at the fingerprint sensor 130.

The ridge flow analysis process 1515 begins at block 1601. At block 1601, the ridge flow analysis module 330 acquires partial image data from a portion of the fingerprint sensor 130. The ridge flow analysis module 330 causes the hardware scan engine 201 to perform the partial scan of the sensor 130. At block 1603, the ridge flow analysis module 330 selects a first region of the partial image 1101, such as one of the regions 1103 illustrated in FIG. 11. In alternative embodiments, the module 330 selects a region of the partial image within a moving window 1105 that corresponds to a first position of the moving window 1105.

At block 1605, the ridge flow analysis module 330 calculates an average for the next directional segment in a sequence including multiple directional segments. For example, FIG. 12 illustrates a direction mask 1201 including a sequence of eight directional segments, where each directional segment includes a set of pixels in the region 1103 that lie along a different axis across the region 1103. Accordingly, at block 1605, the ridge flow analysis module 330 calculates an average intensity for the pixels in the first directional segment of the sequence. For example, for the first directional segment '1', the module 330 averages the intensity values for the pixels marked '1' in the direction mask 1201. The resulting average pixel intensity for directional segment '1' is 139.25 counts, as indicated in the table 1202.

At block 1607, if an average pixel intensity has not been calculated for all of the directional segments in the sequence, the process 1515 returns to block 1605 to calculate an average pixel intensity for the next directional segment in the sequence. In this manner, the process 1515 repeats blocks 1605 and 1607 until an average pixel intensity is calculated for all of the directional segments in the direction mask 1201. Table 1202 in FIG. 12 shows the average pixel intensities for the directional segments 1-8. In alternative embodiments, the calculations of the average pixel intensities for the directional segments are performed in parallel, rather than serially. In embodiments where each directional segment includes the same number of pixels, a sum of the pixel intensities for each directional segment may be calculated instead of an average.

When an average or sum of the pixel intensities has been calculated for each of the directional segments, the process 1515 continues at block 1609. At block 1609, if the center pixel 'C' in the direction mask 1201 has an intensity that is higher than an average intensity of pixels within the region 1103, a direction corresponding to the directional segment having the highest sum or average pixel intensity is recorded as the ridge direction for the segment 1103, as provided at block 1611. However, if the center pixel 'C' has an intensity that is lower than an average intensity of the pixels in the region 1103, a direction corresponding to the directional segment having the lowest sum or average is recorded as the ridge direction for the segment 1103, as provided at block 1613.

At block 1615, if a ridge direction has not yet been recorded for all of the regions 1103 in the partial image 1101, the process 1515 returns to block 1603 and selects the next region 1103 (or moving window 1105 position) of the partial image 1101 for which a ridge direction will be determined. Process 1515 thus repeats blocks 1603-1615 until a ridge direction has been determined for all of the regions 1103 or positions of moving window 1105. When all of the ridge directions have been determined, the process 1515 continues from block 1615 to block 1617.

FIG. 16B illustrates blocks 1617-1637 of the ridge flow analysis process 1515, according to an embodiment. As provided in blocks 1617-1637, the ridge flow analysis process 1515 compares the ridge directions for each region (or moving window position) of the partial image with the ridge directions for neighboring regions and with an average ridge direction of all the regions. The process 1515 then determines whether the imaged object is a finger or a non-finger object based on these comparisons.

At block 1617, the ridge flow analysis module 330 selects a first region (or moving window position) for processing. The ridge flow analysis module 330 compares the ridge direction of this first selected region with the ridge direction of each adjacent region that borders the selected region. Accordingly, at block 1619 an adjacent region bordering the selected region is selected at block 1617. At block 1621, if the adjacent region has a ridge direction that is orthogonal to the ridge direction of the selected region, then the orthogonal neighbor counter 331 is incremented, as provided at block 1623. At block 1621, if the adjacent region has a ridge direction that is not orthogonal to the ridge direction of the selected region, then the orthogonal neighbor counter 331 is not incremented.

From block 1621 or block 1623, the process 1515 continues at block 1625. At block 1625, if there are more regions adjacent to the selected region that have not been processed, then the process 1515 continues back to block 1619. In one embodiment, the ridge flow analysis process 1515 evaluates the orthogonality of ridge directions between each unique pairing of adjacent regions only once; accordingly, adjacent regions that were previously selected at block 1617 are excluded at block 1625 when determining whether more adjacent regions remain to be processed.

At block 1619, the next adjacent region is selected to compare its ridge direction with the ridge direction of the selected region at block 1621. Accordingly, the process 1515 loops through blocks 1619, 1621, 1623, and 1625 to count the number of adjacent regions that have a ridge direction that is orthogonal to the ridge direction of the region selected at block 1617.

When all of the adjacent regions have been considered, the process 1515 continues from block 1625 to block 1627. At block 1627, the ridge flow analysis module 330 calculates a difference between the ridge direction of the selected region and the average ridge direction for all of the regions in the partial image, then determines whether the difference exceeds a threshold amount. If the ridge direction of the selected region differs from the average ridge direction by more than the threshold amount, the module 330 increments the deviation counter 332, as provided at block 1629, before continuing to block 1631. Otherwise, the module 330 does not increment the deviation counter 332 before proceeding to block 1631.

At block 1631, if all of the regions 1103 (or moving window 1105 positions) in the partial image 1101 have not been processed according to blocks 1621 and 1627, the process 1515 returns to block 1617 and selects the next region 1103 or moving window 1105 position for processing. In this manner, the process 1515 loops through blocks 1617-1631 to generate a first count value 331 corresponding to the number of regions having ridge directions that are orthogonal to adjacent ridge directions, and a second count value 332 indicating the number of regions having a ridge direction that differs from the average ridge direction by more than a threshold amount.

At block 1631, if all of the regions 1103 or moving window 1105 positions have been processed, the process 1515 continues to block 1633. At block 1633, the counters 331 and 332 are compared to their corresponding thresholds 343 and 344 by comparators 353 and 354, respectively. If either of the counters 331 and 332 exceeds its corresponding threshold, the imaged object is determined by the ridge flow analysis 1515 to be a non-finger object, at block 1637. If neither of the counters 331 and 332 exceeds its corresponding threshold, then the imaged object is determined by the ridge flow analysis 1515 to be a finger.

Referring back to FIG. 15, if the object passes the ridge flow analysis 1515 as a real finger, then at block 1517, the process 1409 continues at block 1519 and the object is identified as a real finger. Referring back to FIG. 14A, when the object is identified as a finger by block 1409, then the process 1400 continues from block 1411 to block 1413 and the fingerprint sensor controller 120 sends an interrupt to the host device 110 to wake the host from the lower power consumption state.

The process 1400 thus reduces overall power consumption of the fingerprint sensing system 100 by allowing the host device 100 to remain in a low power sleep state until a real finger contacts the fingerprint sensor 130, instead of waking to process image data for non-finger object contacts. Furthermore, the process 1400 reliably distinguishes fingers from non-finger objects so that contacts from non-finger objects can be filtered or processed differently from finger contacts.

In the foregoing embodiments, various modifications can be made; for example, row sensor electrodes and column sensor electrodes may be interchanged, and row or column sensor electrodes may be used as either Tx or Rx sensor electrodes. Furthermore, in some embodiments, intersections between row and column sensor electrodes may be replaced with conductive bridges. For example, bridges may be used to electrically connect portions of sensor electrodes when both row and column sensor electrodes are constructed from a single layer of conductive material. As described herein, conductive electrodes that are "electrically connected" or "electrically coupled" may be coupled such that a relatively low resistance conductive path exists between the conductive electrodes. Quantities or dimensions described as "substantially" equal may be nominally equal but need not be exactly equal (with variations due to manufacturing tolerances, environmental conditions, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In some embodiments, a microprocessor, microcontroller, or other hardware-based processor may perform some or all of the operations of the method(s) herein by executing instructions stored in firmware, flash memory, or other storage medium accessible to a fingerprint sensor controller and/or a host device.

In the foregoing specification, the claimed subject matter has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
   detecting a presence of an object at a fingerprint sensor;
   in response to detecting the presence of the object, acquiring image data for the object based on signals from the fingerprint sensor; and
   for each subset of one or more subsets of the image data,
      calculating a magnitude value for a spatial frequency of the subset; and
      identifying the object as a finger based on comparing the magnitude value to a threshold and comparing ridge directions of a plurality of regions of a surface of the object captured in the image data.

2. The method of claim 1, wherein for each subset of the one or more subsets of the image data, the subset includes intensity values measured from unit cells along a corresponding section line across the fingerprint sensor.

3. The method of claim 2, wherein the one or more subsets of the image data includes a plurality of subsets of the image data, and wherein for each subset of the plurality of subsets of the image data, the section line corresponding to the subset is orthogonal to a section line corresponding to a different subset of the plurality of subsets.

4. The method of claim 1, further comprising:
   for each subset of the one or more subsets of the image data,
      generating a spatial frequency spectrum for the subset by performing a discrete Fourier transform (DFT) of the subset,
      identifying a peak in the spatial frequency spectrum corresponding to a spatial period between 300-700 µm, and
      determining the magnitude value based on a magnitude of the peak.

5. The method of claim 4, wherein the magnitude value is proportional to the square of the magnitude of the peak and is inversely proportional to a mean magnitude value of the spatial frequency spectrum.

6. The method of claim 4, wherein the magnitude value is proportional to the square of the magnitude of the peak and is inversely proportional to a width of the peak.

7. The method of claim 1, wherein calculating the magnitude value comprises performing a Goertzel calculation based on the spatial frequency.

8. The method of claim 1, further comprising, in response to identifying the object as a finger, transitioning a host device from a low power consumption state to a high power consumption state, wherein the fingerprint sensor controller is operable in a different power mode than the host device.

9. A fingerprint sensing circuit, comprising:
   a hardware scan engine to, in response to detecting a presence of an object at a fingerprint sensor, acquire image data for the object based on signals from the fingerprint sensor; and
   a finger detection module coupled with the hardware scan engine and to, for each subset of one or more subsets of the image data:
      calculate a magnitude value for a spatial frequency of the subset, and
      identify the object as a finger based on comparing the magnitude value to a threshold and comparing ridge directions of a plurality of regions of a surface of the object captured in the image data.

10. The fingerprint sensing circuit of claim 9, wherein the one or more subsets of the image data includes a plurality of subsets of the image data, wherein each of the plurality of subsets includes intensity values measured from unit cells along a corresponding section line across the fingerprint sensor, and wherein at least two of the section lines are orthogonal to each other.

11. The fingerprint sensing circuit of claim 9, wherein the finger detection module further comprises a spatial frequency analyzer configured to, for each subset of the one or more subsets of the image data:
   generate a spatial frequency spectrum for the subset by performing a discrete Fourier transform (DFT) of the subset,
   identify a peak in the spatial frequency spectrum corresponding to a spatial period between 300-700 µm, and
   determine the magnitude value based on a magnitude of the peak.

12. The fingerprint sensing circuit of claim 9, wherein the finger detection module comprises Gortzel hardware accelerator circuitry configured to calculate the magnitude value by performing a Goertzel calculation based on the spatial frequency.

13. The fingerprint sensing circuit of claim 9, wherein the finger detection module further comprises a ridge analysis module configured to, for each region of the plurality of regions of the surface of the object captured in the image data:
   for each directional segment of multiple directional segments of the region, calculate a sum of intensities of pixels included in the directional segment,
   if an intensity of a center pixel of the region is lower than an average intensity of pixels in the region, identify a direction corresponding to a directional segment having a lowest sum as a ridge direction of the region, and
   if the intensity of the center pixel of the region is higher than the average intensity of pixels in the region, identify a direction corresponding to a directional segment having the highest sum as the ridge direction of the region.

14. The fingerprint sensing circuit of claim 13, wherein the finger detection module is further configured to identify the object as a finger by, for each region of the plurality of regions:

determining whether the ridge direction of the region differs by at least a threshold amount from an average ridge direction of the plurality of regions, and for each adjacent region bordering the region, determining whether the ridge direction of the region is orthogonal to the ridge direction of the adjacent region.

15. The fingerprint sensing circuit of claim 9, further comprising a false finger rejection module coupled with the finger detection module and configured to transition a host device from a low power consumption state to a high power consumption state in response to the identifying the object as a finger.

16. A fingerprint sensing system, comprising:

a fingerprint sensor;

a fingerprint sensor controller coupled with the fingerprint sensor and configured to:

detect a presence of an object at a fingerprint sensor, in response to detecting the presence of the object, acquire image data for the object based on signals from the fingerprint sensor, and for each subset of one or more subsets of the image data, calculate a magnitude value for a spatial frequency of the subset, and identify the object as a finger based on comparing the magnitude value to a threshold and comparing a first ridge direction of the object to a second ridge direction of the object; and a host device coupled with the fingerprint sensor.

17. The fingerprint sensing system of claim 16, wherein the host device is further configured to, in response to the identifying the object as a finger:

receive the image data from the fingerprint sensor controller; and authenticate a user based on matching the image data with fingerprint data associated with the user.

18. The fingerprint sensing system of claim 16, wherein the fingerprint sensor controller is operable in a different power mode than the host device and is further configured to transition the host device from a low power consumption state to a high power consumption state in response to identifying the object as a finger.

19. The fingerprint sensing system of claim 16, wherein the fingerprint sensor controller is further configured to transmit the magnitude value for the spatial frequency to the host device.

* * * * *